United States Patent
Mokrushin et al.

(10) Patent No.: US 11,800,379 B2
(45) Date of Patent: Oct. 24, 2023

(54) IMPROVING IMMUNE SYSTEM OF SITE USING GENERATIVE ADVERSARIAL NETWORKS AND REINFORCEMENT LEARNING

(71) Applicant: Telefonaktiebolaget LM Ericsson (publ), Stockholm (SE)

(72) Inventors: Leonid Mokrushin, Uppsala (SE); Selim Ickin, Stocksund (SE); Ravi Kiran Kotty, Hyderabad (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 489 days.

(21) Appl. No.: 17/266,254

(22) PCT Filed: Aug. 20, 2018

(86) PCT No.: PCT/EP2018/072430
§ 371 (c)(1),
(2) Date: Feb. 5, 2021

(87) PCT Pub. No.: WO2020/038548
PCT Pub. Date: Feb. 27, 2020

(65) Prior Publication Data
US 2021/0306873 A1    Sep. 30, 2021

(51) Int. Cl.
*H04W 24/02*    (2009.01)
*H04L 41/14*    (2022.01)
(Continued)

(52) U.S. Cl.
CPC ............ *H04W 24/02* (2013.01); *G06N 3/045* (2023.01); *H04L 41/145* (2013.01); *H04L 41/16* (2013.01); *H04W 24/06* (2013.01)

(58) Field of Classification Search
CPC ...... H04W 24/02; H04W 24/06; G06N 3/045; H04L 41/145; H04L 41/16; H04L 41/142; H04L 41/149
See application file for complete search history.

(56) References Cited

U.S. PATENT DOCUMENTS

2014/0365638 A1    12/2014    Shah et al.
2018/0005127 A1    1/2018    Akyamac et al.
(Continued)

FOREIGN PATENT DOCUMENTS

| CN | 107909153 A | 4/2018 |
|---|---|---|
| CN | 105474577 B | 8/2020 |

(Continued)

OTHER PUBLICATIONS

Goodfellow, Ian J., et al., "Generative Adversarial Nets Ian", Departement d'informatique et de recherche operationnelle, Universite de Montreal, Montreal, QC H3C 3J7, Jun. 10, 2014, pp. 1-9.
(Continued)

*Primary Examiner* — Peter P Chau
(74) *Attorney, Agent, or Firm* — Murphy, Bilak & Homiller, PLLC

(57) ABSTRACT

Methods include training, using a generative adversarial network, a generator model using data noise that includes data corresponding to real problems of a telecommunication site, generating a generated problem that has not occurred at
(Continued)

the telecommunication site and that has a non-zero probability of occurring at the site in the future, providing the generated problem to a virtual agent that is configured to generate a solution action to resolve the generated problem, evaluating the solution action relative to the generated problem to determine a performance value corresponding to the solution action, and responsive to the performance value being higher than other performance values corresponding to other solution actions for the generated problem, generating a generic problem model that corresponds to the generated problem and that is associated with the solution action.

22 Claims, 23 Drawing Sheets

(51) Int. Cl.
*H04L 41/16* (2022.01)
*H04W 24/06* (2009.01)
*G06N 3/045* (2023.01)

(56) References Cited

U.S. PATENT DOCUMENTS

2018/0192303 A1 7/2018 Hui et al.
2019/0149425 A1* 5/2019 Larish .................... H04L 43/08
706/16

FOREIGN PATENT DOCUMENTS

WO 2018078213 A1 5/2018
WO 2018127273 A1 7/2018

OTHER PUBLICATIONS

Radford, Alec, et al., "Unsupervised Representation Learning with Deep Convolutional Generative Adversarial Networks", ICLR 2016, Jan. 7, 2016, pp. 1-16.
Silver, David, "Lecture 1: Introduction to Reinforcement Learning", https://www.davidsilver.uk/wp-content/uploads/2020/03/intro_RL.pdf, 2015, pp. 1-46.

* cited by examiner

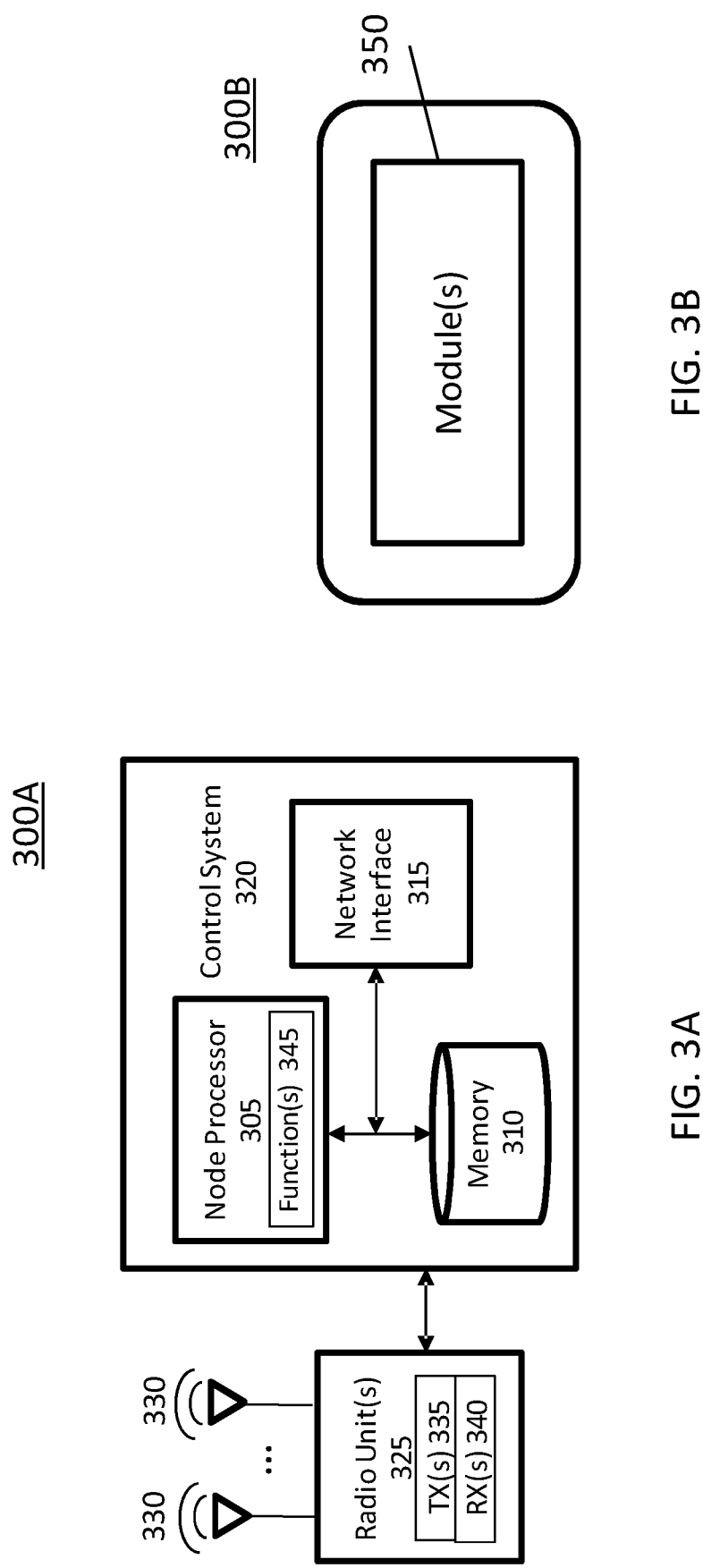

IMPROVING IMMUNE SYSTEM OF SITE USING GENERATIVE ADVERSARIAL NETWORKS AND REINFORCEMENT LEARNING

TECHNICAL FIELD

The disclosed subject matter relates generally to telecommunications. Certain embodiments relate more particularly to improving responsiveness to issues in mobile networks.

BACKGROUND

Millions of alarms and tickets with various severities are created every day due to issues in mobile network sites. Handling these issues in a quick manner by operators may be a challenge and costly. The issues on the sites may be resolved in a reactive manner after the domain experts analyze in depth the content of alarms and/or tickets. As this process is reactive, however, the issue resolution time should not be long as it may impact the customer's quality of experience, and lead to revenue loss. Thus, the limited amount of problem solving time puts high pressure on site engineers, which might indirectly affect the quality of solutions provided, such as short-sighted fixes/patches.

The current maintenance pipeline consists of multiple stages, such as key performance indicator (KPI) degradation detection, alarm creation, ticket creation, work-order creation, and finally fixing and resolving the issues. As can be estimated, the process may take long time, especially, if the problem and the corresponding solution are not straightforward.

With machine learning techniques, such as supervised learning, the occurrence of certain issues can be predicted by analyzing the historical records and generating corresponding ML model. However, conventional approaches do not address issues that have never happened before, which may still be reactive and thus take more time to resolve, as there is no previous solution available.

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

Example methods, nodes, and systems are operable to perform methods of operating a wireless device in a wireless communication network. Such methods may include training, using a generative adversarial network, a generator model using data noise that includes data corresponding to real problems of a telecommunication site, generating a generated problem that has not occurred at the telecommunication site and that has a non-zero probability of occurring at the site in the future, providing the generated problem to a virtual agent that is configured to generate a solution action to resolve the generated problem, evaluating the solution action relative to the generated problem to determine a performance value corresponding to the solution action, and, responsive to the performance value being higher than other performance values corresponding to other solution actions for the generated problem, generating a generic problem model that corresponds to the generated problem and that is associated with the solution action.

In some embodiments, training the generator model includes using a generative adversarial network to iteratively generate multiple generated problems that are indistinguishable from real problems that have occurred. Some embodiments provide that the generative adversarial network includes the generator model that is configured to generate the generated problems that correspond to the data noise and a discriminator model that is configured to determine a probability corresponding to each of the generated problems that corresponds to a likelihood that the corresponding one of the problems is a real problem.

Some embodiments provide that training the generator model includes providing the probability corresponding to each of the generated problems to the generator model. Some embodiments provide that, responsive to the probability corresponding to one of the generated problems being less than a percentage threshold, the generator model is further configured to receive an error signal and to generate a next one of the generated problems as a modified generated problem.

In some embodiments, the discriminator model is configured to decompose a set of input vectors in a real problem matrix into a probability value that corresponds to whether the input vector corresponds to a real problem or the generated problem. Some embodiments provide that the generator model is configured to compose a set of input vectors in a generated problem matrix from the data noise that includes data corresponding to real problems of a telecommunication site.

Some embodiments include, responsive to a loss performance of the generator model converging with a loss performance of the discriminator model, determining that the generator model is trained. In some embodiments, if the generator model is trained then the generated problems have a greater than 50 percent chance of being realistic problems that the telecommunication site could experience in the future.

Some embodiments provide generating, by the virtual agent, a problem label that corresponds to the generated problem. The solution action may be provided by the virtual agent and the virtual agent may use training resources to identify the solution action that includes a performance value that is higher than other performance values.

In some embodiments, the virtual agent evaluates the solution action using a simulation of the telecommunication site, an emulation of the telecommunication site and/or the telecommunication site. Some embodiments provide that evaluating the solution action includes iteratively evaluating multiple solution actions to determine an acceptable performance value.

In some embodiments, generating the generic problem model includes using a relational description learner to generate multiple generic problem models that correspond to different problems that the telecommunication site has not experienced. Some embodiments include, responsive to the virtual agent determining a solution action that is successful at the telecommunication site, receiving, by the virtual agent a reward metric that is provided by the telecommunication site.

In some embodiments, the generic problem model includes multiple generic problem models. Some embodiments include aggregating, by a relational description learner, the multiple generic problem models. In some embodiments, aggregating the generic problem models includes performing supervised machine learning using symbolic representations of problems. Some embodiments provide that performing supervised machine learning includes receiving a first symptom set corresponding to the generated problem as a hypothesis corresponding to one of the real problems of the telecommunications site, comparing the hypothesis to a second symptom set to determine a difference between the hypothesis and the second symptom set, and modifying the hypothesis based on the difference between the hypothesis and the second symptom set and based on a label that corresponds to the first symptom set to generate a second hypothesis.

In some embodiments, generating the generic problem model includes generating multiple generic problem models. Operations may include matching an observed state of the telecommunication site to one of the generic problem models to detect an occurring real problem of a telecommunication site and providing the solution action that corresponds to the one of the generic problem models.

Some embodiments include computer program products comprising a non-transitory computer readable medium storing program code that when executed by a processor of a wireless device causes the wireless device to perform operations disclosed herein.

Some embodiments include computer program products comprising a non-transitory computer readable medium storing program code that when executed by a processor of a network node in a wireless communication network causes the network node to perform operations disclosed herein.

Some embodiments include a UE adapted to perform operations disclosed herein.

Some embodiments are directed to a radio communication network that includes a radio node that includes a transceiver to provide wireless communication over a radio interface, at least one processor coupled to the transceiver, and at least one memory coupled to the at least one processor and storing program code that when executed by the at least one processor causes the at least one processor to perform operations including training, using a generative adversarial network, a generator model using data noise that includes data corresponding to real problems of a telecommunication site, generating a generated problem that has not occurred at the telecommunication site and that has a non-zero probability of occurring at the site in the future, providing the generated problem to a virtual agent that is configured to generate a solution action to resolve the generated problem, evaluating the solution action relative to the generated problem to determine a performance value corresponding to the solution action, and responsive to the performance value being higher than other performance values corresponding to other solution actions for the generated problem, generating a generic problem model that corresponds to the generated problem and that is associated with the solution action.

Some embodiments are directed to a network node in a wireless communication network, including a transceiver to provide wireless communication over a radio interface, at least one processor coupled to the transceiver, and at least one memory coupled to the at least one processor and storing program code that when executed by the at least one processor causes the at least one processor to perform operations comprising training, using a generative adversarial network, a generator model using data noise that includes data corresponding to real problems of a telecommunication site, generating a generated problem that has not occurred at the telecommunication site and that has a non-zero probability of occurring at the site in the future, providing the generated problem to a virtual agent that is configured to generate a solution action to resolve the generated problem, evaluating the solution action relative to the generated problem to determine a performance value corresponding to the solution action, and responsive to the performance value being higher than other performance values corresponding to other solution actions for the generated problem, generating a generic problem model that corresponds to the generated problem and that is associated with the solution action.

In some embodiments, training the generator model includes a using a generative adversarial network to iteratively generate multiple generated problems that are indistinguishable from real problems that have occurred. Some embodiments provide that the generative adversarial network includes the generator model that is configured to generate the generated problems that correspond to the data noise and a discriminator model that is configured to determine a probability corresponding to each of the generated problems that corresponds to a likelihood that the corresponding one of the problems is a real problem. In some embodiments, training the generator model further includes providing the probability corresponding to each of the generated problems to the generator model. Some embodiments provide that, responsive to the probability corresponding to one of the generated problems being less than a percentage threshold, the generator model is further configured to receive an error signal and to generate a next one of the generated problems as a modified generated problem.

Some embodiments provide that the discriminator model is configured to decompose a set of input vectors in a real problem matrix into a probability value that corresponds to whether the input vector corresponds to a real problem or the generated problem. In some embodiments, the generator model is configured to compose a set of input vectors in a generated problem matrix from the data noise that includes data corresponding to real problems of a telecommunication site.

Some embodiments provide, responsive to a loss performance of the generator model converging with a loss performance of the discriminator model, determining that the generator model is trained. Some embodiments provide that if the generator model is trained then the generated problems have a greater than 50 percent chance of being realistic problems that the telecommunication site could experience in the future.

Some embodiments include generating, by the virtual agent, a problem label that corresponds to the generated problem. Some embodiments provide that the solution action is provided by the virtual agent and that the virtual agent uses training resources to identify the solution action that includes the performance value that is higher than other performance values.

In some embodiments, the virtual agent evaluates the solution action using a simulation of the telecommunication site, an emulation of the telecommunication site and/or the telecommunication site.

Some embodiments provide that evaluating the solution action includes iteratively evaluating multiple solution actions to determine an acceptable performance value.

In some embodiments, generating the generic problem model includes using a relational description learner to generate multiple generic problem models that correspond to different problems that the telecommunication site has not experienced.

Some embodiments include, responsive to the virtual agent determining a solution action that is successful at the telecommunication site, receiving, by the virtual agent a reward metric that is provided by the telecommunication site. In some embodiments, the generic problem model includes multiple generic problem models. Some embodiments include aggregating, by a relational description learner, the multiple generic problem models. In some embodiments, aggregating the generic problem models includes performing supervised machine learning using symbolic representations of problems.

Some embodiments provide that performing supervised machine learning includes receiving a first symptom set corresponding to the generated problem as a hypothesis corresponding to one of the real problems of the telecommunications site, comparing the hypothesis to a second symptom set to determine a difference between the hypothesis and the second symptom set, and modifying the hypothesis based on the difference between the hypothesis and the second symptom set and based on a label that corresponds to the first symptom set to generate a second hypothesis.

In some embodiments, generating the generic problem model includes generating multiple generic problem models. Operations may include matching an observed state of the telecommunication site to one of the generic problem models to detect an occurring real problem of a telecommunication site and providing the solution action that corresponds to the one of the generic problem models.

Some embodiments are directed to a wireless communication device that includes a transceiver to provide wireless communication over a radio interface, at least one processor coupled to the transceiver, and at least one memory coupled to the at least one processor and storing program code that when executed by the at least one processor causes the at least one processor to perform operations including training, using a generative adversarial network, a generator model using data noise that includes data corresponding to real problems of a telecommunication site, generating a generated problem that has not occurred at the telecommunication site and that has a non-zero probability of occurring at the site in the future, providing the generated problem to a virtual agent that is configured to generate a solution action to resolve the generated problem, evaluating the solution action relative to the generated problem to determine a performance value corresponding to the solution action, and responsive to the performance value being higher than other performance values corresponding to other solution actions for the generated problem, generating a generic problem model that corresponds to the generated problem and that is associated with the solution action.

Some embodiments are directed to a computer program product that includes a computer readable storage medium having computer readable code embodied in the computer readable storage medium that when executed by a processor of a wireless communication device causes the wireless communication device to perform operations including training, using a generative adversarial network, a generator model using data noise that includes data corresponding to real problems of a telecommunication site, generating a generated problem that has not occurred at the telecommunication site and that has a non-zero probability of occurring at the site in the future, providing the generated problem to a virtual agent that is configured to generate a solution action to resolve the generated problem, evaluating the solution action relative to the generated problem to determine a performance value corresponding to the solution action, and responsive to the performance value being higher than other performance values corresponding to other solution actions for the generated problem, generating a generic problem model that corresponds to the generated problem and that is associated with the solution action.

Some embodiments are directed to a network node that includes a training module that is configured to train, using a generative adversarial network, a generator model using data noise that includes data corresponding to real problems of a telecommunication site, a problem generating module that is configured to generate a generated problem that has not occurred at the telecommunication site and that has a non-zero probability of occurring at the site in the future, a solution action module that is configured to provide the generated problem to a virtual agent that is configured to generate a solution action to resolve the generated problem, an evaluating module that is configured to evaluate the solution action relative to the generated problem to determine a performance value corresponding to the solution action, and a generic problem model generating module that, responsive to the performance value being higher than other performance values corresponding to other solution actions for the generated problem, is configured to generate a generic problem model that corresponds to the generated problem and that is associated with the solution action.

BRIEF DESCRIPTION OF THE DRAWINGS

The drawings illustrate selected embodiments of the disclosed subject matter. In the drawings, like reference labels denote like features.

FIGS. 3A and 3B, which are schematic block diagrams illustrating radio access nodes corresponding to some embodiments herein.

DETAILED DESCRIPTION

Figure 1:
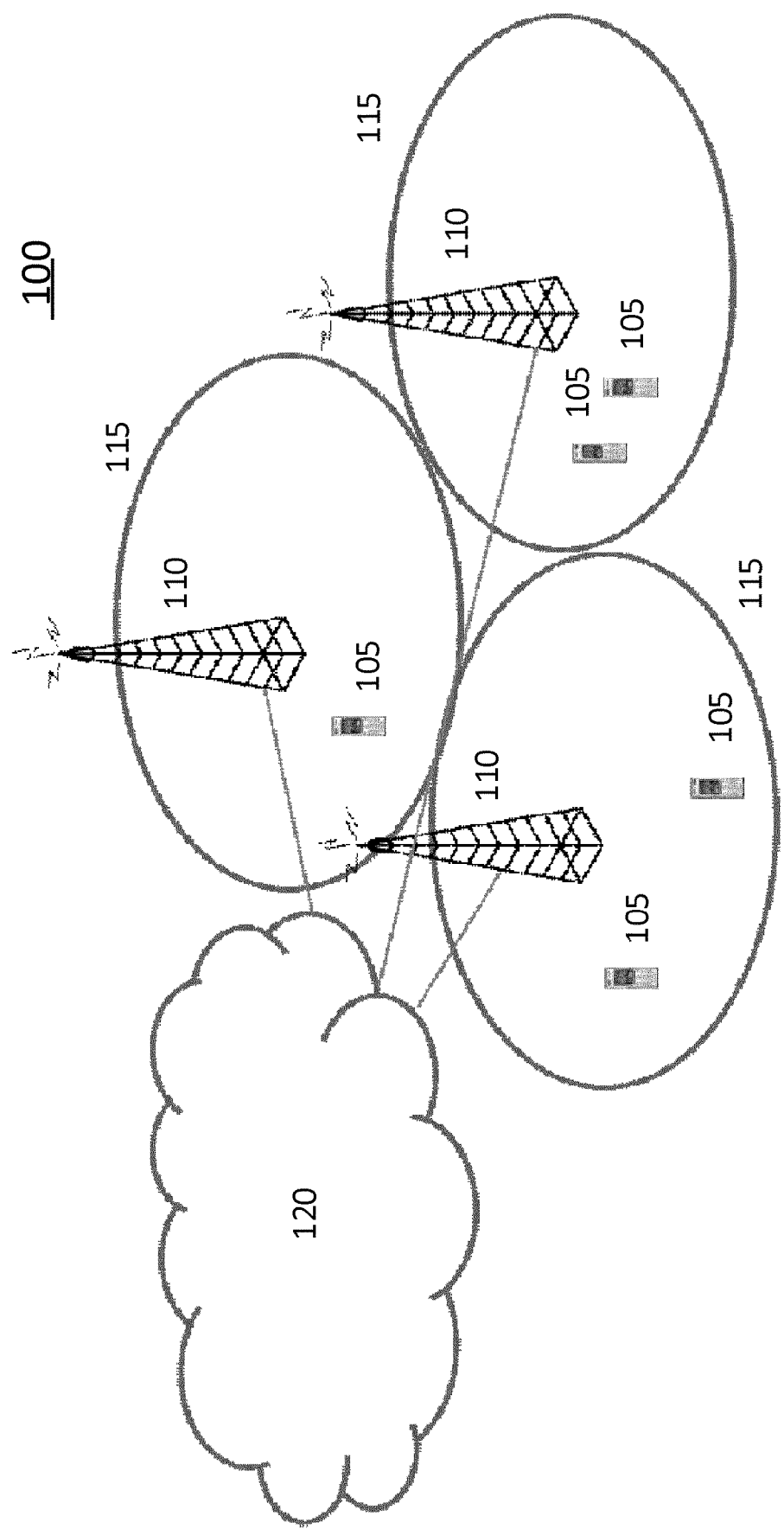
FIG. 1 is a diagram illustrating a wireless network according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Note that terminology such as base station, 5G base station, NR base station, NodeB, gNode B or eNode B and UE should be considering non-limiting and does in particular not imply a certain hierarchical relation between the two; in general "NodeB" and "UE" could be considered as devices that communicate with each other over some radio channel. A generic term network node is used in some embodiments. The network node can be a base station, access point, RRH, RRU, radio network node, gNodeB, transmission reception point (TRP), NodeB or eNode B a core network node (e.g., MME, SON node, positioning node, MDT node, MCE, MBMS node etc). A generic term wireless device is used in some embodiments. The wireless device can be any type of UE such as LTE UE, New Radio (NR) UE, NB-IoT UE, M2M UE, V2V UE, V2X UE, UE of particular category (e.g. UE category NB1, UE category M1, UE category 0 etc) etc. A generic term radio node used herein may be a network node or a wireless device.

In some embodiments, a term operating bandwidth (BW) is used. Over the operating BW the network node transmits to and/or receives signal from one or more UEs in a cell. The operating bandwidth may interchangeably referred to as channel bandwidth, system bandwidth, transmission bandwidth, cell bandwidth, cell transmission BW, carrier bandwidth etc. The operating BW, may be expressed in different units. Examples of units are kHz, MHz, number of resource blocks, number of resource elements, number of subcarriers, number of physical channels, number of frequency resource units etc. The frequency channel or carrier frequency over which a RAT operates is enumerated or addressed by a channel number aka absolute radio frequency channel number (ARFCN) e.g. E-UTRA ARFCN (EARFCN) in LTE and/or NR, among others.

In some embodiments, a signal can be an uplink (UL) signal, a downlink (DL) signal or a sidelink (SL) signal. An uplink signal, which is transmitted by the wireless device, can be a physical signal or a physical channel. Examples of uplink physical signal are SRS, DMRS etc. Examples of uplink physical channel are PUCCH, PUSCH, NPUSCH, NPUCCH, PRACH, NPRACH etc. A DL signal, which is transmitted by the network node, can be a physical signal or a physical channel. Examples of DL physical signal are CRS, DMRS, PRS, CSI-RS etc. Examples of downlink physical channels are PDCCH, PDSCH, NPDSCH, NPDCCH, PMCH etc. A sidelink (SL) signal, which is transmitted by a UE capable of direct UE to UE operation (aka D2D operation, V2V operation etc), can be a physical signal or a physical channel. Examples of SL physical signal are SLSS, DMRS etc. Examples of SL physical channel are PSSCH, PSCCH, PSDCH, PSBCH etc.

The term "numerology" used herein may refer to any one or more attributes defining signal characteristics. Examples of such attributes are: subcarrier spacing, symbol duration, CP duration (aka CP length), time slot duration, subframe duration, number of subcarriers per physical channel, number of physical channels within the bandwidth, etc. A physical channel used herein refers to any time-frequency radio resource. Examples of physical channels are resource block (RB), physical RB (PRB), virtual RB (VRB) etc.

The term "time resource" used herein may correspond to any type of physical resource or radio resource expressed in terms of length of time. Examples of time resources are: symbol, time slot, subframe, short subframe, mini-slot, radio frame, TTI, interleaving time, etc.

The term FeMBSFN subframe may comprise, e.g., an MBSFN subframe configured according to eMBMS enhancements including, for example, new numerology, 1.25 kHz subcarrier spacing, in subframe #0, #4, #5, #9, etc., among others. The term mixed cell unicast/FeMBSFN subframes may comprise e.g. a cell transmitting one or more FeMBSFN subframes and one or more subframe with at least unicast data or PDSCH.

As used herein, a "radio node" is either a radio access node or a wireless device.

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a next generation Node B (gNB) in NR, a high-power or macro base station, a low-power base station (e.g., a micro base station, a pico base station, a home eNB, or the like), and a relay node.

As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

As used herein, a "wireless device" is any type of device that is capable of wirelessly transmitting and/or receiving signals to/from another wireless device or to/from a network node in a cellular communications network to obtain access to (i.e., be served by) the cellular communications network. Some examples of a wireless device include, but are not limited to, a User Equipment device (UE) in a 3GPP network, a Machine Type Communication (MTC) device, an NB-IoT device, an FeMTC device, etc.

As used herein, a "network node" is any node that is used and can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, etc.

As used herein, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

As used herein, the non-limiting term WAN (wireless access network or RAN, radio access network) node can be a UE or a network node (e.g. access point, BS etc.) The WAN node may be interchangeably called as cellular node, NW source node etc.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system. Moreover, in the description herein, reference may be made to the term "cell" however, particularly with respect to Fifth Generation (5G) concepts, beams may be used instead of cells and, as such, it is important to note that the concepts described herein are equally applicable to both cells and beams. Further, an LAA mechanism according to embodiments herein may be used for New Radio (NR).

According to some embodiments herein, an immune system for a site may include a virtual agent that is presented, using a generative model, with potential issues or combinations of issues/scenarios that might happen in the future and that have never happened earlier. The virtual agent may find the best solution to the generated problem using a reinforcement learning algorithm while first replicating the problem in a simulation and/or an emulation environment. Once a suitable solution to the possible future problem is identified, the problem that was generated by the generator model and the solution that was obtained by the virtual agent may be submitted to a relational description learner (RDL). The RDL may then create a generic problem model and listen to the network for a future occurrence of the problem. When the problem occurs in the future, the RDL may apply the solution to the problem by interacting directly with the system by applying the solution to the system. A feedback loop from the system to the virtual agent may provide information regarding the success of the solution to a given problem. In this manner, the problem solving time of upcoming issues may be reduced.

Advantages of embodiments herein may include the ability to fix unusual problems (anomalies) in an automated and efficient manner. Further, operational cost may be reduced by reducing the elapsed man hours to solve the problem. For example, site down time may be reduced in circumstances in which the generated problem would result in the site being down. Yet further, rapid resolution of the problem may improve the quality of experience (QoE) for an end user. As the solution to a future possible problem would readily be available previously identified, the problem solving time may be minimized.

The described embodiments may be implemented in any appropriate type of communication system supporting any suitable communication standards and using any suitable components. As one example, certain embodiments may be implemented in an LTE network, such as that illustrated in FIG. 1. Although certain embodiments are described with respect to LTE systems and related terminology, the disclosed concepts are not limited to LTE or a 3GPP system. Additionally, although reference may be made to the term "cell", the described concepts may also apply in other contexts, such as beams used in Fifth Generation (5G) systems, for instance.

Reference is now made to FIG. 1, which is a diagram illustrating an LTE network according to some embodiments. A communication network 100 comprises multiple wireless devices 105 and multiple radio access nodes 110. Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2A:
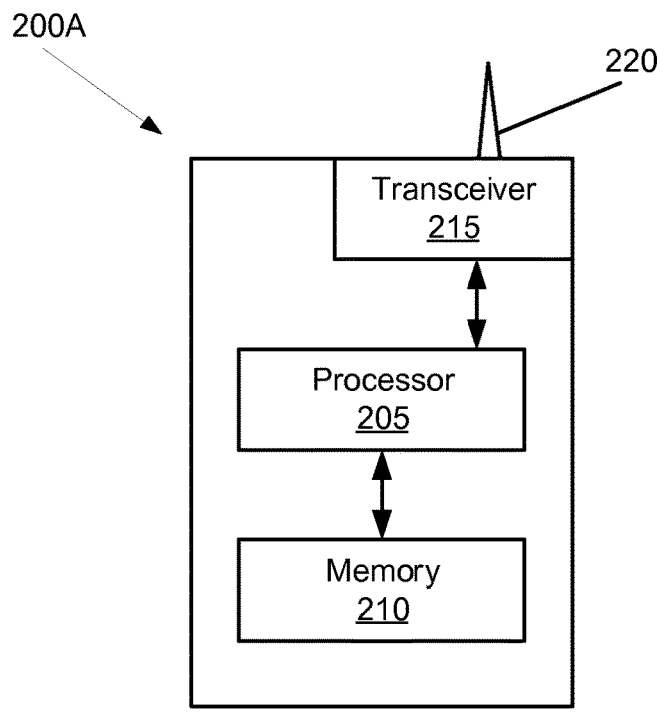
FIGS. 2A and 2B are diagram illustrating wireless devices according to some embodiments.
Figure 2B:
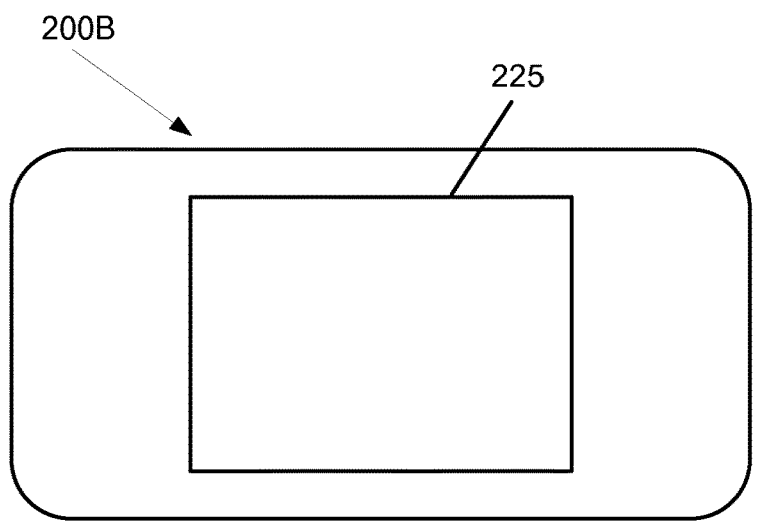

Although wireless devices 105 may represent communication devices that include any suitable combination of hardware and/or software, these wireless devices may, in certain embodiments, represent devices such as an example wireless device illustrated in greater detail by FIGS. 2A and 2B. Similarly, although the illustrated radio access node may represent network nodes that include any suitable combination of hardware and/or software, these nodes may, in particular embodiments, represent devices such those illustrated in greater detail by FIGS. 3A, 3B and 4.

The wireless communication device 200A, which may be referred to herein as a UE 200, (also referred to as a wireless terminal, a wireless communication device, a wireless communication terminal, user equipment, a user equipment node/terminal/device, etc.) may be configured to provide operations according to embodiments of inventive concepts. Referring to FIG. 2A, a wireless communication device 200A includes a processor circuit 205, also referred to as a processor, (e.g., Central Processing Units [CPUs], Application Specific Integrated Circuits [ASICs], Field Programmable Gate Arrays [FPGAs], and/or the like), a memory 210, a transceiver circuit 215, also referred to as a transceiver, and an antenna 220.

The processor 205 may be coupled to the transceiver 215 and the memory 210. The memory 210 may include computer readable program code that when executed by the processor 205 causes the processor 205 to perform operations according to embodiments disclosed herein for a wireless communication device 200A. According to other embodiments, processor 205 may be defined to include memory so that a separate memory circuit is not required. The wireless communication device 200A may also include an interface (such as a user interface) coupled with processor 205.

As discussed herein, operations of the wireless communication device 200A may be performed by the processor 205 and/or transceiver 215. For example, processor 205 may control transceiver 215 to transmit communications through transceiver 215 over a radio interface to another node and/or to receive communications through transceiver 215 from another node over a radio interface. Moreover, modules may be stored in memory 210, and these modules may provide instructions so that when instructions of a module are executed by processor 205, processor 205 performs respective operations (e.g., operations discussed below with respect to example embodiments).

In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2A. Some embodiments include additional components beyond those shown in FIG. 2A that may be responsible for providing certain aspects of the device's functionality, including any of the functionality described herein.

Referring to FIG. 2B, a wireless communication device 200B comprises at least one module 225 configured to perform one or more corresponding functions. Examples of such functions include various method steps or combinations of method steps as described herein with reference to wireless communication device(s). In general, a module 225 may comprise any suitable combination of software and/or hardware configured to perform the corresponding function. For instance, in some embodiments a module 225 comprises software configured to perform a corresponding function when executed on an associated platform, such as that illustrated in FIG. 2A.

Reference is now made to FIGS. 3A and 3B, which are schematic block diagrams illustrating radio access nodes corresponding to some embodiments herein. Referring to FIG. 3A, a radio access node 300A includes a control system 320 that includes a node processor 305 (e.g., Central Processing Units (CPUs), Application Specific Integrated Circuits (ASICs), Field Programmable Gate Arrays (FPGAs), and/or the like), memory 310, and a network interface 315. In addition, radio access node 300A includes at least one radio unit 325 including at least one transmitter 335 and at least one receiver coupled to at least one antenna 330. In some embodiments, radio unit 325 is external to control system 320 and connected to control system 320 via, e.g., a wired connection (e.g., an optical cable). However, in some other embodiments, radio unit 325 and potentially the antenna 330 are integrated together with control system 320. Node processor 305 operates to provide at least one function 345 of radio access node 300A as described herein. In some embodiments, the function(s) are implemented in software that is stored, e.g., in the memory 310 and executed by node processor 305.

In certain embodiments, some or all of the functionality described as being provided by a base station, a node B, an enodeB, a gNB, and/or any other type of network node may be provided by node processor 305 executing instructions stored on a computer-readable medium, such as memory 310 shown in FIG. 3A. In some embodiments, a radio access node 300 may include additional components to provide additional functionality, such as the functionality described herein and/or related supporting functionality.

Referring to FIG. 3B, a radio access node 300B includes at least one module 350 configured to perform one or more corresponding functions. Examples of such functions include various method steps and/or operations or combinations of method steps and/or operations as described herein with reference to radio access node(s). In general, a module 350 may include any suitable combination of software and/or hardware configured to perform the corresponding function. For instance, in some embodiments a module includes software configured to perform a corresponding function when executed on an associated platform, such as that illustrated in FIG. 3A.

Figure 4:
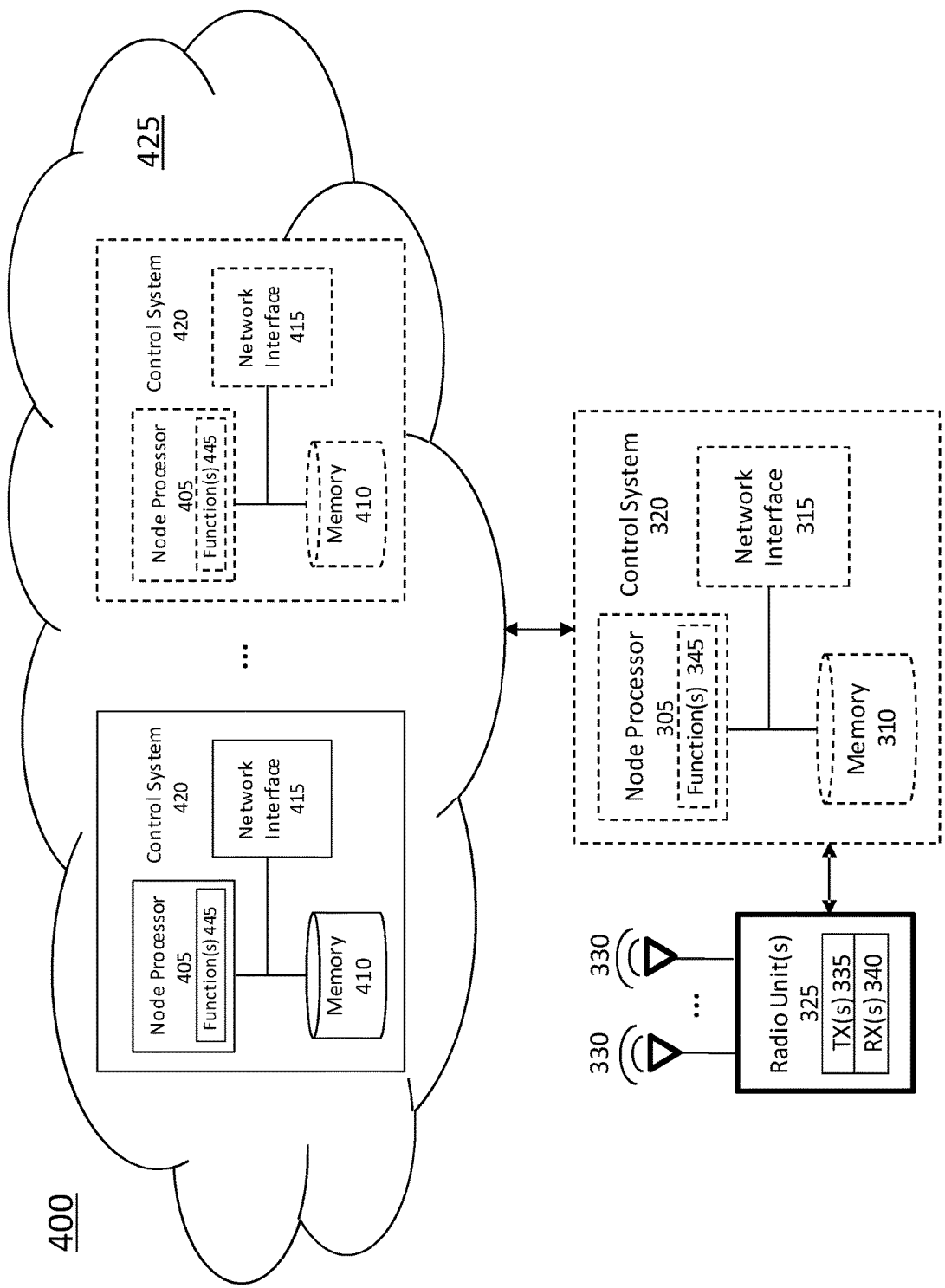
FIG. 4 is a block diagram that illustrates a virtualized radio access node according to some embodiments herein.

FIG. 4 is a block diagram that illustrates a virtualized radio access node 400 according to some embodiments herein. The concepts described in relation to FIG. 4 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 4, radio access node 400 comprises control system 320 as described above regarding FIG. 3A.

Control system 320 is connected to one or more processing nodes 420 coupled to or included as part of a network(s) 425 via network interface 315. Each processing node 420 may include one or more processors 405 (e.g., CPUs, ASICs, FPGAs, and/or the like), memory 410, and a network interface 415.

In some embodiments, functions 345 of radio access node 300A described herein may be implemented at the one or more processing nodes 420 and/or distributed across control system 320 and the one or more processing nodes 420 in any desired manner. In some embodiments, some or all of the functions 345 of radio access node 300A described herein are implemented as virtual components executed by one or more virtual machines implemented in a virtual environment(s) hosted by processing node(s) 420. Additional signaling and/or communication between processing node(s) 420 and control system 320 may be used in order to carry out at least some of the desired functions 345. As indicated by dotted lines, in some embodiments control system 320 may be omitted, in which case the radio unit(s) 325 communicate directly with the processing node(s) 420 via an appropriate network interface(s).

Figure 5:
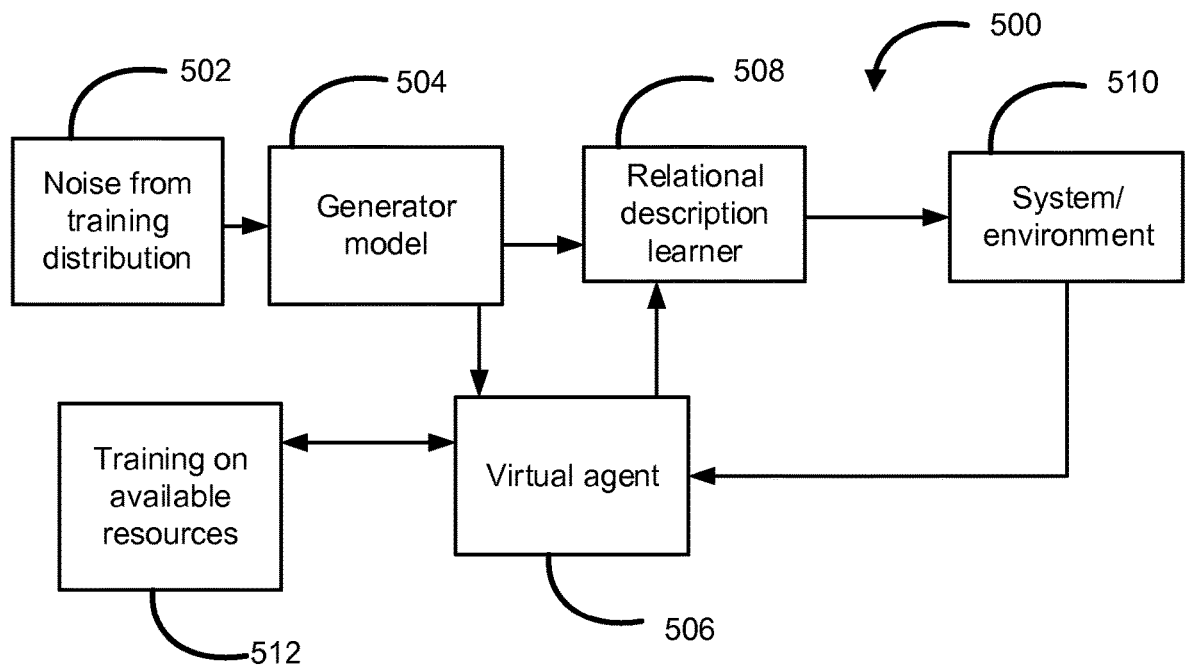
FIG. 5 is a flow diagram illustrating components and operations corresponding to systems and methods according to some embodiments.

Reference is now made to FIG. 5, which is a flow diagram illustrating components and operations corresponding to systems and methods according to some embodiments. According to some embodiments, a site may be prepared to address future problems that have not yet occurred. Noise data 502 that corresponds to a training distribution of data may be provided. The noise data 502 may include real problems and/or scenarios sampled from a latent distribution of the training set that includes some known problems. A trained generative model 504 may receive the noise data 502. In some embodiments, the generative model 504 may send a generated problem to a virtual agent 506. The generative model may send the generated problem to a relational description learner (RDL) 508.

The virtual agent 506 may create a problem label and a solution by training and learning the best solution of the corresponding problem by interacting with the available training resources 512. The training resources 512 may include a simulation, emulation and/or a real physical environment, such that the generated scenario can be installed and the generated problem may be replicated. Then the virtual agent 506 may take random actions until the best solution and/or solution set is found. The task of the virtual agent 506 is to automatically operate in an experimentation mode by replicating the scenario in a lab environment and finding a reasonable solution to the generated problem. This may be performed iteratively until a problem is addressed with the best solution by the virtual agent 506. These operations may be included in a training phase.

Once the best solution to the generated problem is found by the virtual agent 506, the generated problem and the corresponding solution are sent to RDL 508. The RDL 508 may have both the generated problem and the corresponding solution. The task of RDL 508 is to generate Generic Problem Model (GPM) for every class of generated problems and associate the GPM with the corresponding solution provided by the virtual agent 506.

In some embodiments, a system/environment 510 may experience a new problem therein. The new problem may be sent to the RDL 508 to be compared to all GPMs. If a GPM is found for the new problem, the corresponding solution mapping is extracted from the GPM and is provided and/or applied to the system/environment 510. An outcome corresponding to the solution that is provided to the system/environment 510 is provided by the system/environment 510 as a feedback to the virtual agent 506. The feedback may be useful in such cases when the solution generated by the virtual agent 506 to solve the given problem does not work and the virtual agent 506 agent provides different solution set. Over time, the virtual agent 506 may learn the best solution based on the feedback that identifies whether or not the provided solution solved the problem. In some embodiments, a reward or a penalty may be assessed against the virtual agent 506 depending on the outcome.

Some embodiments provide that the training set is enriched overtime with the addition of real world training samples as time goes on. In this manner, the newly generated problems from the generator model evolve over time and may not be limited to the original latent space, which may represent a limited training set. In this manner, the generator model may be able to continue to generate new problems over time.

Figure 6:
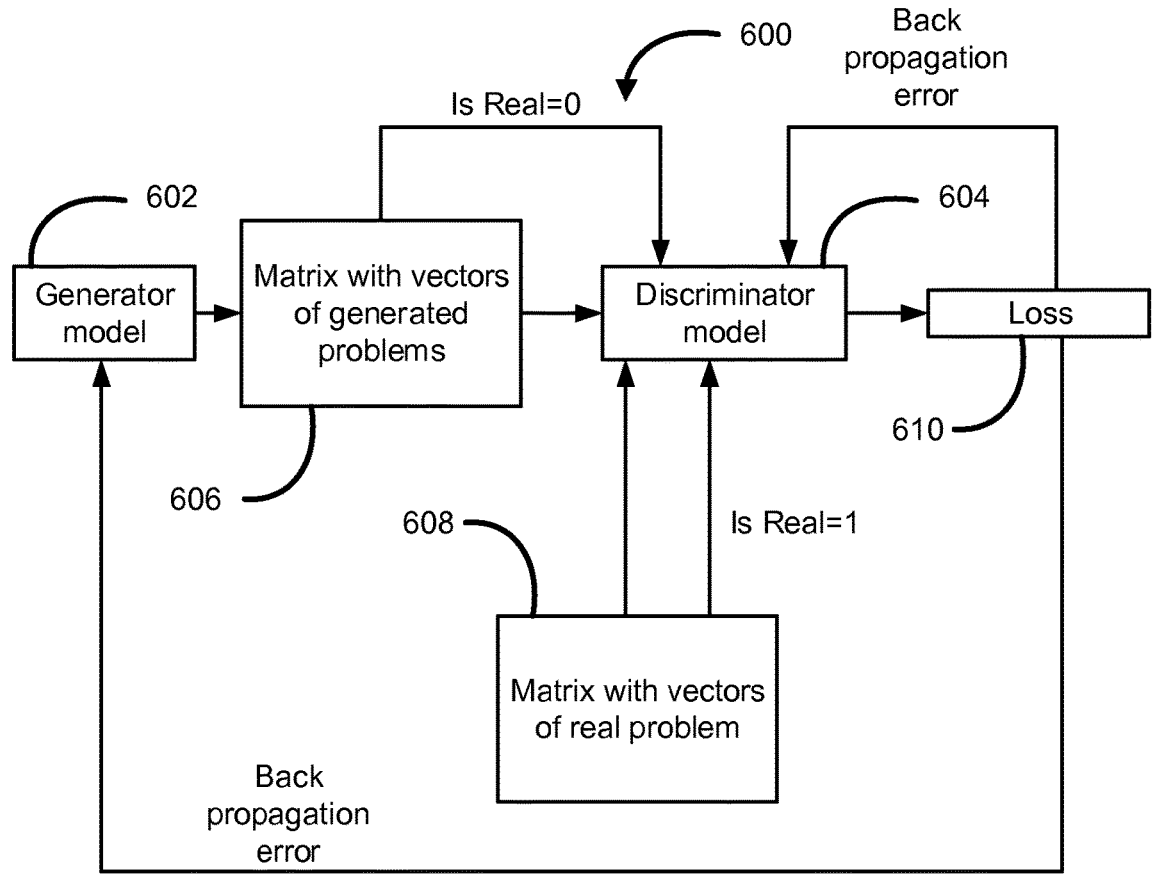
FIG. 6 is a flow diagram that illustrates a GAN network being trained using a generator model and a discriminator model competing with one another according to some embodiments herein.

In some embodiments, the generative model 504 may be trained using Generative Adversarial Network (GAN). A GAN may generally be applicable in the context of semi-supervised learning. Brief reference is now made to FIG. 6, which is a flow diagram that illustrates a GAN network being trained using a generator model 602 and a discriminator model 604 competing with one another according to some embodiments herein. A GAN may create features that characterize a particular class. The GAN may include the generator model 602 and the discriminator model 604 in which each of these may work together to achieve a training outcome.

For example, the discriminator model 604 may attempt to classify the data and may be pre-trained using a labeled training set. The generator model 602 may generate new data samples that are similar to the original training dataset. To evaluate this, the generator model 602 may create input samples that are similar to the training set with a goal of providing samples that the discriminator model 604 cannot discern the generated data from the real training data. The evaluation of this generated data may be performed by the discriminator model 604 and may be fed back to the generator model 602 such that the generator model 602 may attempt to generate more realistic input next time. A goal is to reach Nash equilibrium between the generator model 602 and the discriminator model 604.

Once, the generator model 602 is improved such that it is able to fool the discriminator model 604 by generating realistic features that might be coming from the original feature set distribution, the training may end and the generator model 602 may be deployed. After deployment, the generator model 602 may learn to create new realistic (i.e., similar to the original training set) features that characterize a class (e.g., a feature set that characterizes a site going down).

Some embodiments provide that the discriminator model 604 can be pre-trained to some level with real and fake samples, and should be able to classify correctly among the two classes (real or fake). In some embodiments, the learning rate of discriminator model 604 may be increased to allow the system to converge to equilibrium. Eventually, the discriminator model losses and the generator model losses may converge. For example, the losses of the generator model 602 may decrease and losses of the discriminator model 604 may increase. A min-max process according to some embodiments is as follows:

Discriminator model (D) aims to maximize its reward by minimizing its loss; and

Generator model (G) aims to minimize Discriminator (D)'s reward by maximizing its loss.

Figure 7:
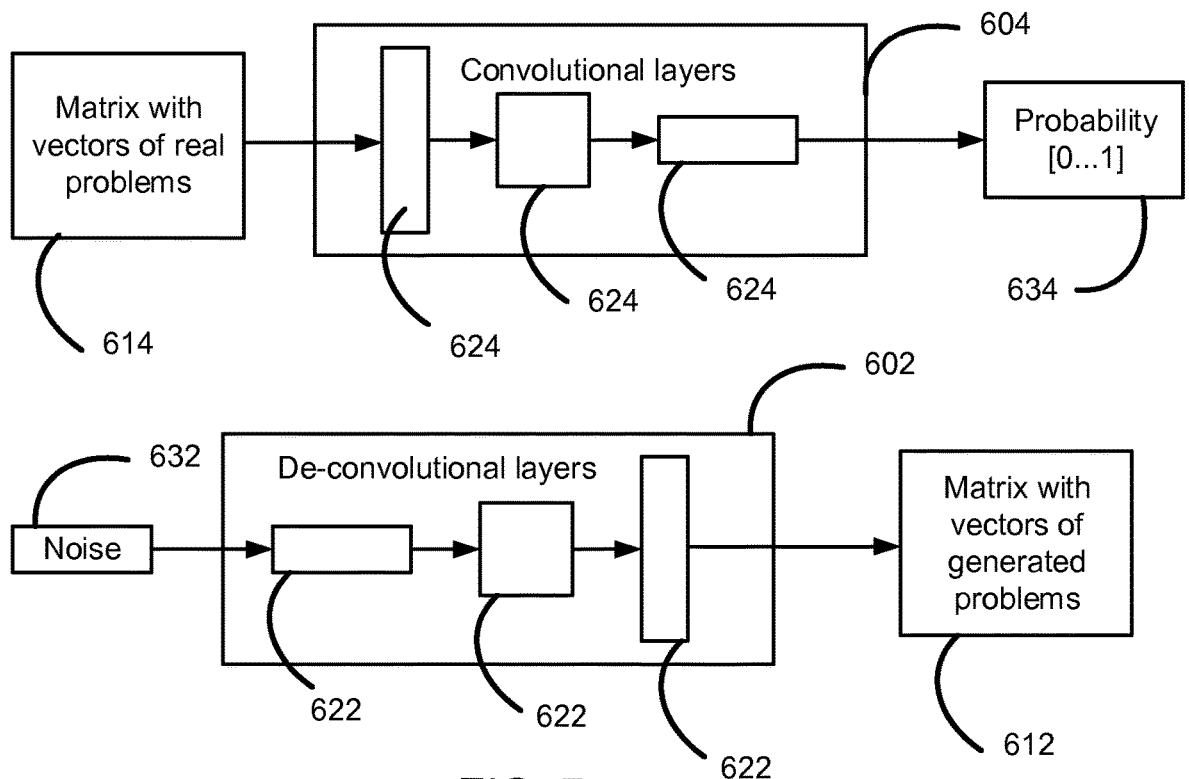
FIG. 7 is a flow diagram that illustrates architectures of a discriminator model and a generator model according to some embodiments herein.

Brief reference is now made to FIG. 7, which is a flow diagram that illustrates architectures of a discriminator model 604 and a generator model 602 according to some embodiments herein. As illustrated, an architecture corresponding to the discriminator model 604 may include receiving a matrix 614 that includes multiple input vectors that correspond to real problems. As the discriminator model 604 operates, the feature set is reduced as the set of convolutional layers narrows 624, ultimately reaching a probability 634 regarding whether the problem is a real problem or a problem that was generated by the generator model 602.

The architecture of the generator model 602 may be considered as substantially inverse to that of the discriminator model 604. For example, the generator model 602 may start with noise 632 that may be used to generate input vectors that correspond to generated problems. Additional features may be added in as a set of de-convolutional layers 622 of the model are developed adding dimensions to ultimately generate a matrix 612 of generated input vectors.

Figure 8:
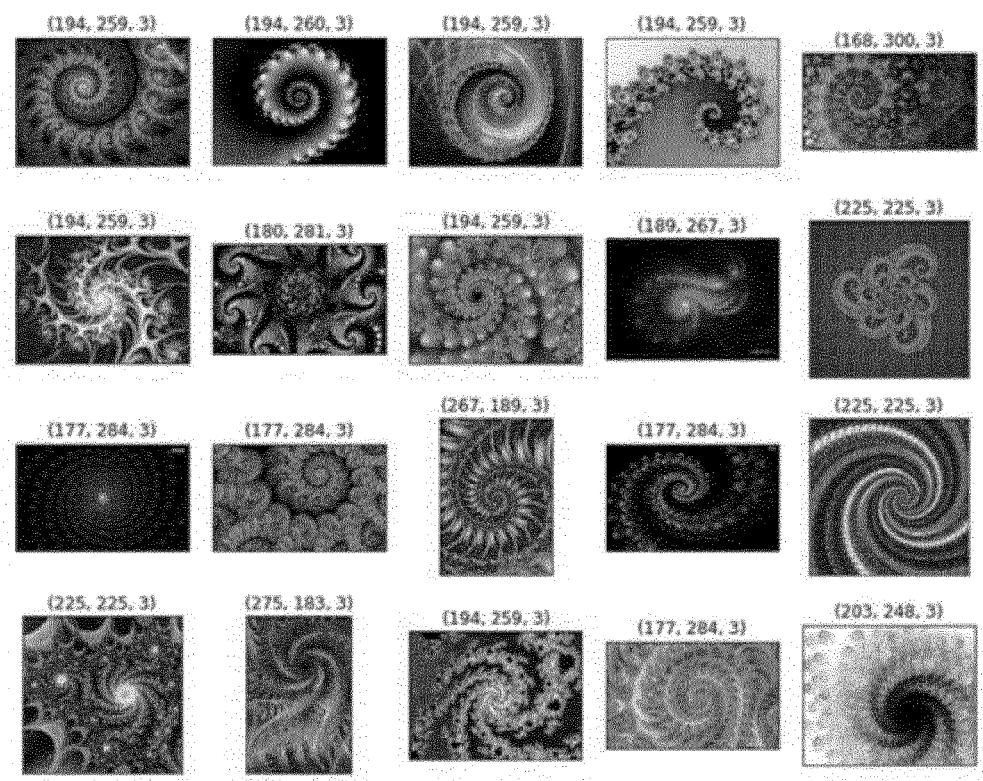
FIG. 8 is a set of real publicly available fractal images that may be used to provide example training to the discriminator model according to some embodiments herein.
Figure 9:
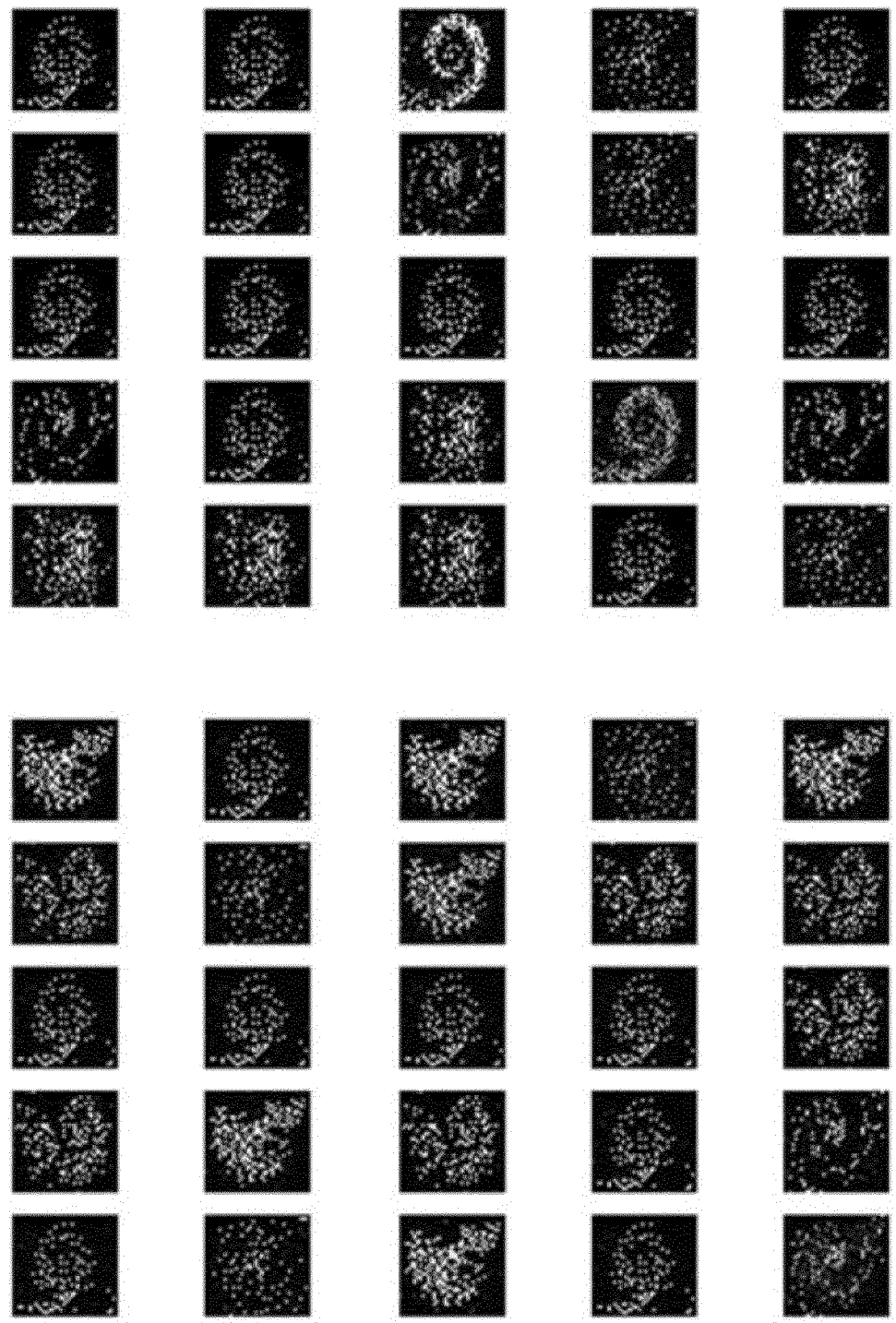
FIG. 9 is a set of generated images that are based on the set of real images that were used in the training.

By way of example, brief reference is now made to FIG. 8, which is a set of real fractal images that may be used to provide example training to the discriminator model 604 according to some embodiments herein. Based on the real fractal images, the generator model may be applied to generate similar images to those in the set of real images. Brief reference is now made to FIG. 9, which is a set of generated images that are based on the set of real images that were used in the training. As shown, although not all of the generated images have the appearance of fractals, a general fractal pattern is visible, which indicates that the model was capable of generating images similar to those in the training set. The images of FIG. 9 are generated based on training that corresponds to only black and white images based on a single channel data.

Figure 10:
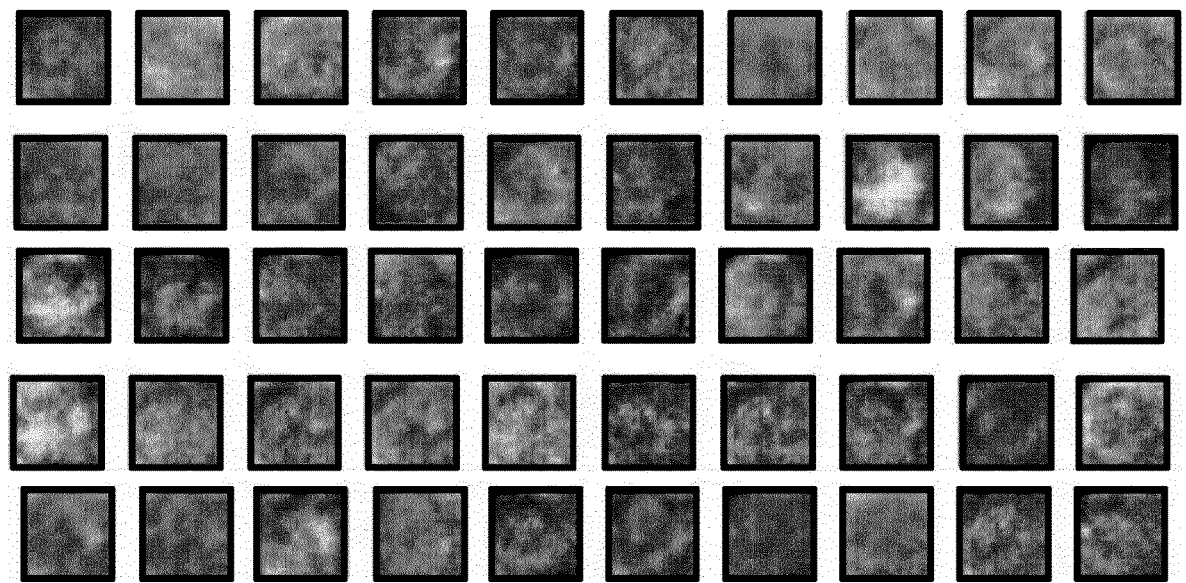
FIG. 10 is a set of generated images that are based on the set of real images that were used in the training that sued color data based on three channel data.

Brief reference is now made to FIG. 10, which is a set of generated images that are based on the set of real images that were used in the training that used color data based on three channel data. As illustrated, training the network with the color data may be more challenging. For example, as illustrated some of the images of FIG. 10 look like fractals that did not exist in the training set. Such images suggest that the generative model 602 is able to capture the distribution of the training set in a reasonably short training time.

Some embodiments provide that in the context of a managed services data set, a GAN may be used to create new realistic problems in the form of scenarios that include a state vector. Examples include alarm sequences and time series that have never happened before and that might cause severe failures such as causing a site to be down. A training set may be constructed from the existing dataset. The input training set is a matrix of problem vectors, which represent discretely the space of possible events that have happened in the past. This may be used as input to the discriminator model 604, which may classify the generated problems as realistic or not. For example, Table 1 alarm sequence where the goal is to generate realistic set of alarms before a site goes down. A GAN model may be trained such that the generative model is able to understand the distribution of the training set (where each instance contains a vector stating whether the 32 alarm types are triggered or not) and is able to create similar type of alarms that might lead the site going down. Example vector input in the training set is given in Table 1, below.

TABLE 1

| Alarm Type | 1 | 2 | ... | ... | 30 | 31 | 32 |
|---|---|---|---|---|---|---|---|
| Value | 1 | 0 | ... | ... | 0 | 0 | 1 |

As provided above, the sequence is such that Alarm type 1 and Alarm type 32 are triggered before a site goes down. This training set contains 145 diverse example vectors similar to the above. For demonstration purposes the model is simplified and only takes the alarm types into consideration. With more diverse data, and more effort on the algorithm tuning, the created scenarios are expected to become less obvious and more useful.

Figure 11:
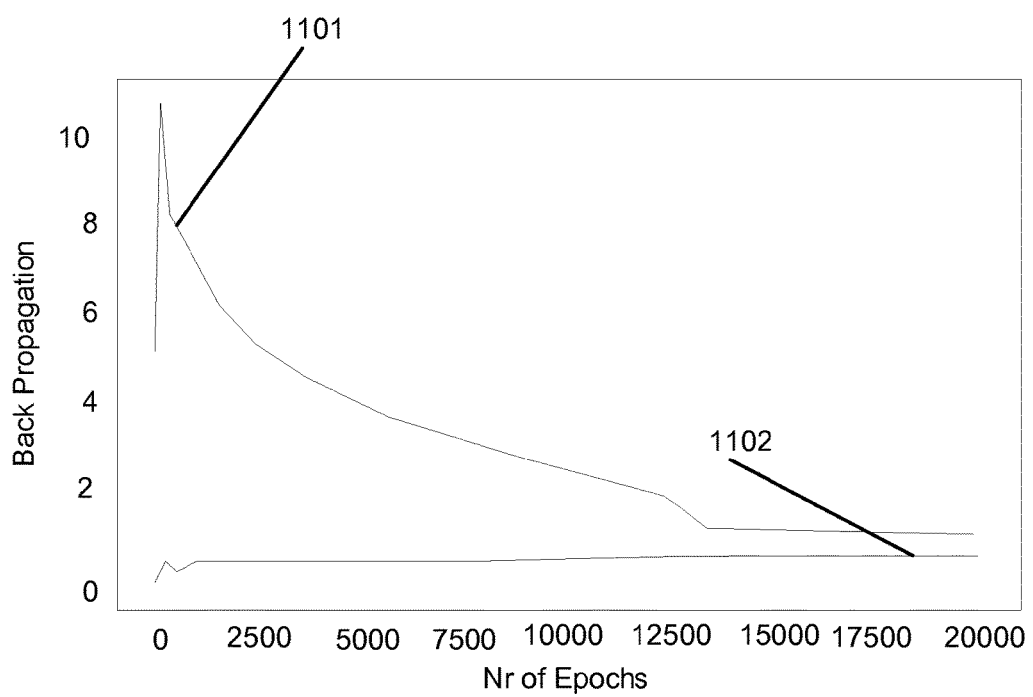
FIG. 11 is a plot of example data of losses of a discriminator model and a generator model as a function of the number of training epochs according to some embodiments.

Reference is now made to FIG. 11, which is a plot of example data of losses of a discriminator model and a generator model as a function of the number of training epochs according to some embodiments. The generator model losses 1101 are decreasing as the number of training epochs increases. In contrast, the discriminator model losses 1102 are increasing, although at a slower rate than the generator model losses 1101 are decreasing. The contrasting direction of losses may indicate that the GAN training is proceeding correctly and that the competition between the generator model 602 and the discriminator model 604. As the number of epochs increases, the loss values of the generator model and the discriminator model move towards one another as they move towards a convergence. The convergence and/or a reduction in further convergence may signal that the training may be stopped.

Figure 12:
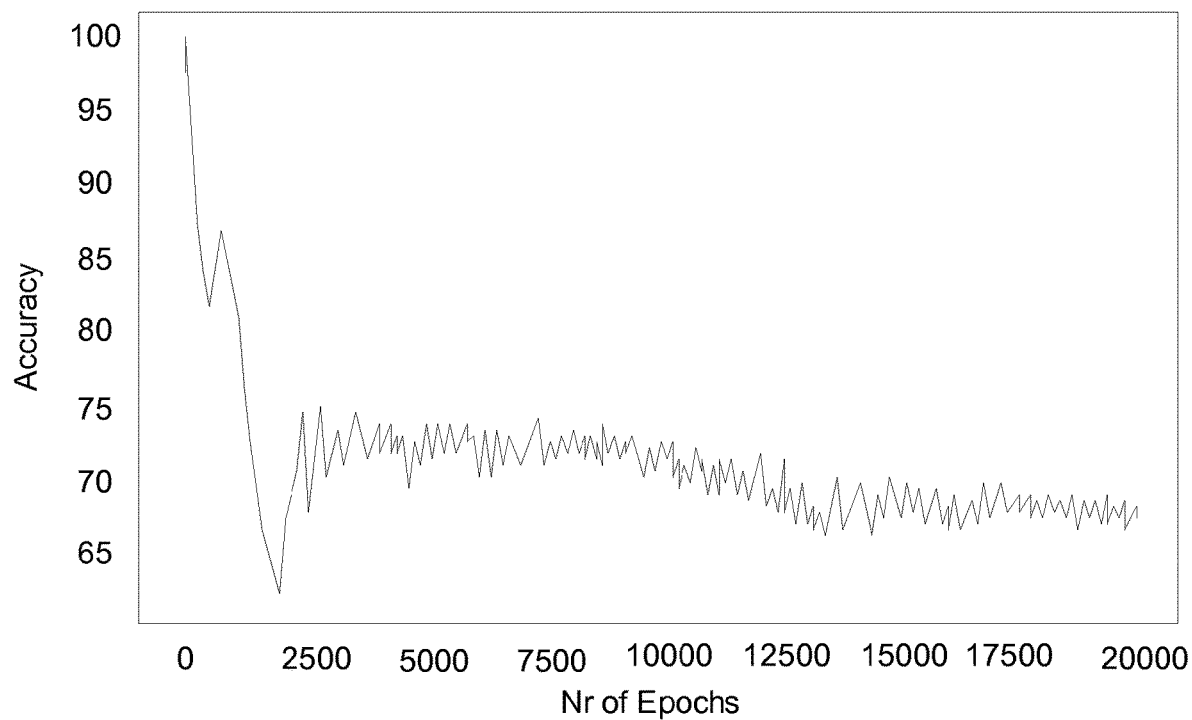
FIG. 12 is a plot of example data of the accuracy of the discriminator model as a function of the number of training epochs according to some embodiments.

Brief reference is made to FIG. 12, which is a plot of example data of the accuracy of the discriminator model 604 as a function of the number of training epochs according to some embodiments. As illustrated, the accuracy of the discriminator model may stay at around 60-70%. In some embodiments, a goal may be to achieve a stable accuracy around 50%, which would then indicate that the discriminator model 604 cannot distinguish between a real alarm sequence for a site down and a generated alarm sequence.

Figure 13:
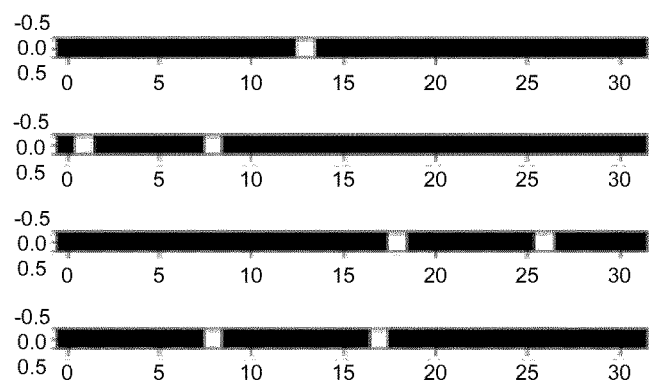
FIG. 13 includes a set of real training set distribution of alarms according to some embodiments.
Figure 14:
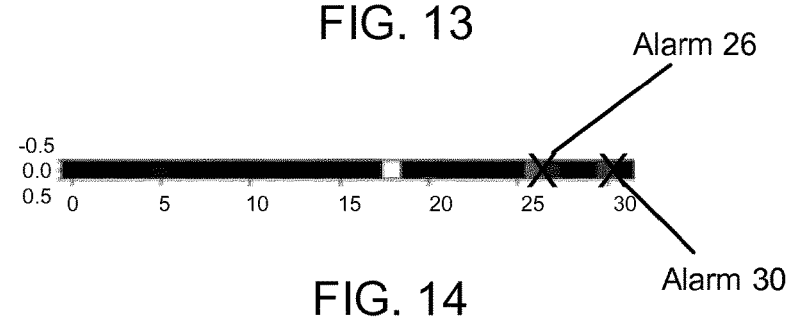
FIG. 14 includes a set of generated distribution of alarms according to some embodiments.

After the training, the generator model 602 may be used to create alarms that, if real, could eventually cause the site to go down. Brief reference is made to FIG. 13, which includes a set of real training set distribution of alarms according to some embodiments. As illustrated, Row 1 include an alarm type 13, Row 2 includes alarm types 1 and 8, Row 3 includes alarm types 18 and 26 and Row 4 includes alarm types 8 and 12. Brief reference is now made to FIG. 14, which includes a set of generated distribution of alarms according to some embodiments. As illustrated, the generated set of alarms includes an alarm type 18 and probability of alarm types 26 and 30. For example, the generated alarm sequence may include an alarm type 18: 'UtranCell ServiceUnavailable', alarm type 26: 'CELL LOGICAL CHANNEL AVAILABILITY SUPERVISION BCCH', and alarm type 30: 'SCTP Link Congestion'. Note that the generated example may look realistic to the discriminator model 604 but may actually be generated and may represent alarms that may be generated in the future. Although the current example identifies specific examples of alarm types, the disclosure herein contemplates that any variety of alarms and/or alarm types may be used according to embodiments herein. Note that this combination of alarms was not seen in the training set, and thus represents an unseen scenario. In this manner, the model may provide an unseen insight to the virtual agent 506 so that the virtual agent 506 may start training by experimenting with different solutions on the problem before the problem really appears. This may reduce the time to identify the issue and allow the problem to be fixed it in a short time duration that would eventually reduce the time of 'site down' state.

Figure 15:
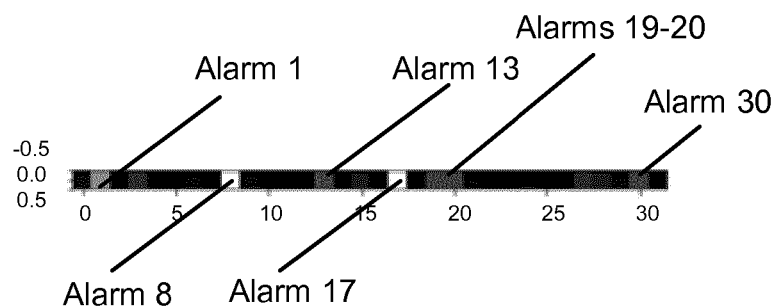
FIG. 15 includes another set of generated distribution of alarms according to some embodiments.

Reference is now made to FIG. 15, which includes another set of generated distribution of alarms according to some embodiments. As illustrated, the generated set of alarms includes high probability of alarm types 8 and 17 and a low probability of alarm types 1, 13, 19, 20 and 30. For example, the generated alarm sequence may include alarm type 1: Physical port down (low probability), alarm type 8: UMTS Cell Unavailable (high probability), alarm type 13: Board Blocked (low probability), alarm type 17: 3G: SITE OUTAGE HUA (high probability), alarm type 19: Number of Resources Used Reaching Alarm Threshold Specified by (low probability), alarm type 20: External Alarm (low probability), and alarm type 30: SCTP Link Congestion (low probability).

Based on the example output, the above generated scenario may indicate that the following alarms might happen in the future based on the generation by the model. This allows the virtual agent 506 to address realistic what-if questions in advance by actuating a set of actions in the simulator/emulator and learning the right action to solve the upcoming problem depending on the corresponding reward received after the actuation. Such actions may include configuration changes and/or increasing transmission power while creating the same conditions/scenarios that are generated by the generator model 602. Some embodiments provide that modeling that includes a diverse dataset may provide more advanced unseen insights related to managed services.

Figure 16:
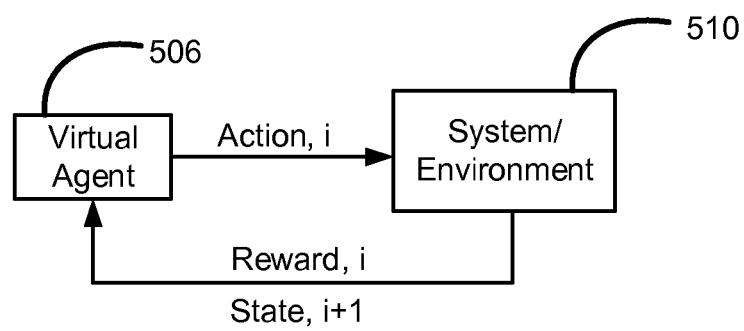
FIG. 16 is a block diagram of an RL algorithm according to some embodiments disclosed herein.

As described above, problems and/or states that correspond to issues that have not occurred may be generated by the GAN. Some embodiments provide that reinforcement learning (RL) may improve the performance of the virtual agent 506. For example, RL may be a self-learning machine learning algorithm, that may start with randomized actions and learns over time, the best action for a given state (e.g., a problem/state provided by a generative model). The virtual agent 506 may gradually learn from its experiences and interactions via iterative actions and accordingly changing environment states. A best action may be determined with the help of reward function. For example, brief reference is now made to FIG. 16, which is a block diagram of an RL algorithm according to some embodiments disclosed herein. As illustrated, the system/environment 510 may interact within the virtual agent 506 in performing the RL operations. Some embodiments provide that the system/environment 510 may receive an action from the virtual agent 506 that corresponds to a problem and/or state of the system/environment 510. For each given state, including the initial state of the environment, an action may be taken. The action intervenes the system/environment 510 and the state is updated. If the updated state is an improvement over the previous state, the virtual agent 506 may receive a reward from the system/environment 510. If the updated state is not an improvement relative to the previous state, a penalty or negative reward may be assessed or set against the virtual agent 506. Additionally, the virtual agent 506 may then generate an action responsive to the updated state.

Suppose that the generated problem in FIG. 15 is sent to the virtual agent 506. The virtual agent 506 may create exactly those alarm sequences in a simulation/emulation environment. Then, by changing actionable parameters such as transmission power, tunable KPI's in the site configuration file, the virtual agent 506 may be informed about the consequences of the change. The process may continue iteratively until the initially reproduced alarms are cleared in the simulator/emulator. When the training is complete, the virtual agent 506 submits the scenario and the corresponding best solution, e.g., the configuration file, to the RDL.

As provided above regarding FIGS. 5 and 15, a virtual agent 506 may be a symbolic learner (e.g., a software), which can learn via an RL algorithm that runs on one computer and that continuously listens for new environment states and/or rewards corresponding to previous actions being taken. The virtual agent 506 may respond again with more actions by interacting directly with the system/environment 510. An example of an action may include a configuration change in a base station, among others.

Some embodiments provide that a relational description learner, RDL, 508 may be used to build and maintain a generic model every problem type based on problem occurrence examples by performing supervised machine learning using symbolic representations of problems. First, the RDL may be presented with issue symptoms (e.g. alarm vectors as in the example above), a label (e.g., "the site is down"), and the solution (e.g., "reset the baseband unit"). The RDL may use the first symptom set as a hypothesis of the situation description when the site goes down. When a subsequent set of symptoms for "the site is down" is given to RDL, it may generalize both sets and may use that generalization as a refined hypothesis. The process repeats, and the most refined hypothesis may then be used as a generic model for the problem leading to "the site is down". It is then possible to match new problem symptom set with the generic models of various problems to detect type of the problem and the corresponding solution.

In some embodiments, a process of generalizing a model of a problem may be follows:
Assume symptom set $S_1$ as the initial hypothesis $H_1$ about an issue;
Process subsequent symptom sets $S_i$ (i=2, 3, . . . );
Match current hypothesis with $S_i$; let the result of matching be D, the difference between $H_{i-1}$ and $S_i$,
Modify according to D and given label. The label may tell that $S_i$ represents symptoms of I (positive example) or that $S_i$ represents a situation which is definitely not an issue I (negative example).

Figure 17:
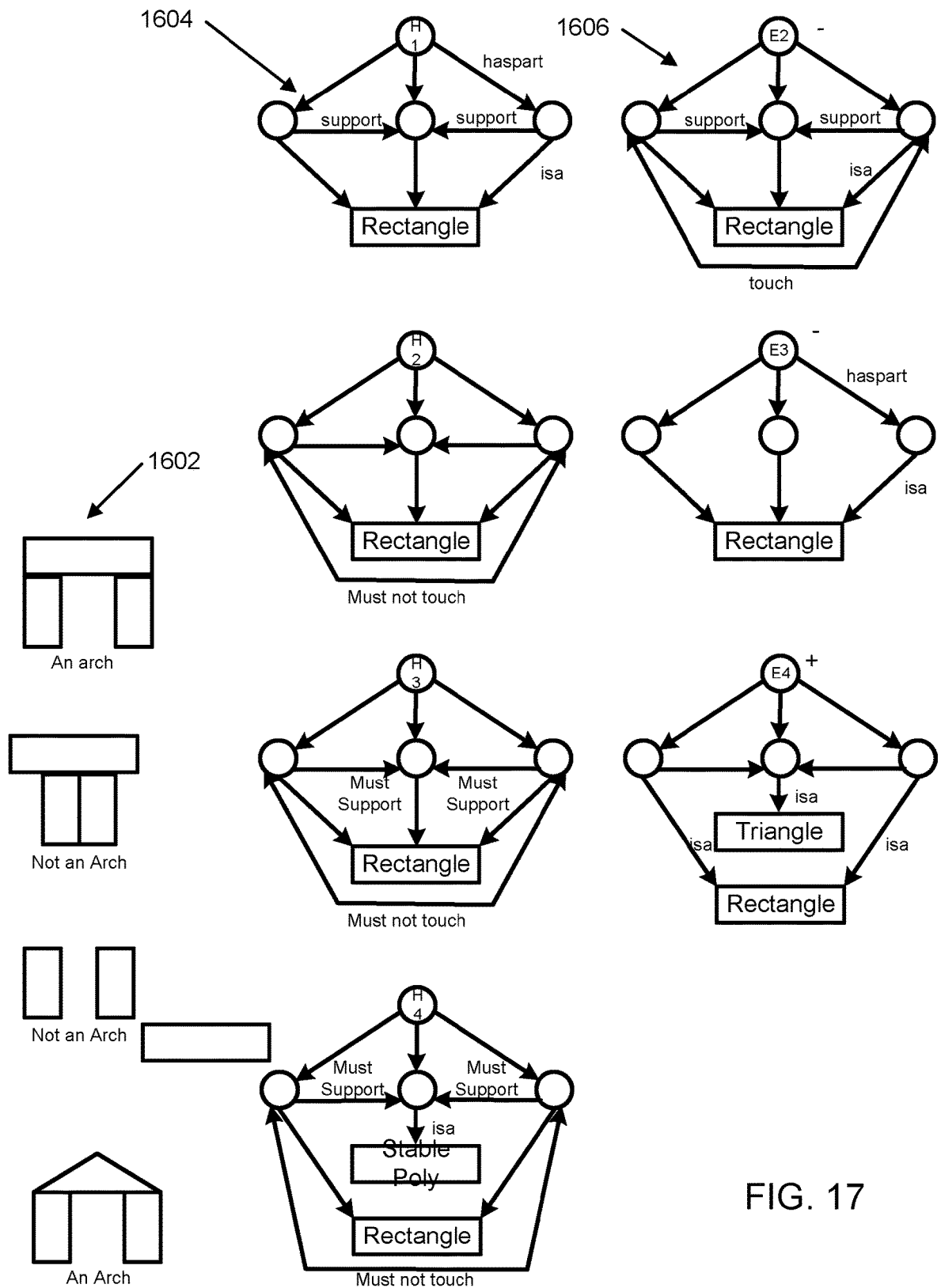
FIG. 17 is schematic diagram illustrating a training set and a sequence of hypothesis refinement steps while learning a generic model of an arch symbolically according to some embodiments.

Reference is now made to FIG. 17, which is schematic diagram illustrating a training set and a sequence of hypothesis refinement steps while learning a generic model of an arch symbolically according to some embodiments. As illustrated, a sample column 1602 contains pictures of example arches, the hypothesis column 1604 includes current refined hypotheses of a symbolic model of a generalized arch, and the training example column 1606 includes symbolic models of the positive (marked with a "+") and negative (marked with a "−") training examples. Every refinement step updates the current hypothesis such that features from the positive training examples and negations of examples from negative examples are merged therein. Similarly, a generic problem model (a refined hypothesis about the issue) consisting of a description of symptoms (analogous to training examples) and corresponding solution (analogous to positive and negative markings) provided by an expert can be built symbolically as a set of concepts and relations between them for every issue type. Multiple different sets of symptoms of the issue type may be generalized in GPM using the above described method. An action may be generated that matches the observed state of the system to one of the GPMs to detect an occurring issue. The GPM may also contain a special type of relation in it (e.g. "has solution") that may link to a description of the issue solution (part of the symbolic model of the positive training examples) associated with the matched GPM.

Figure 18:
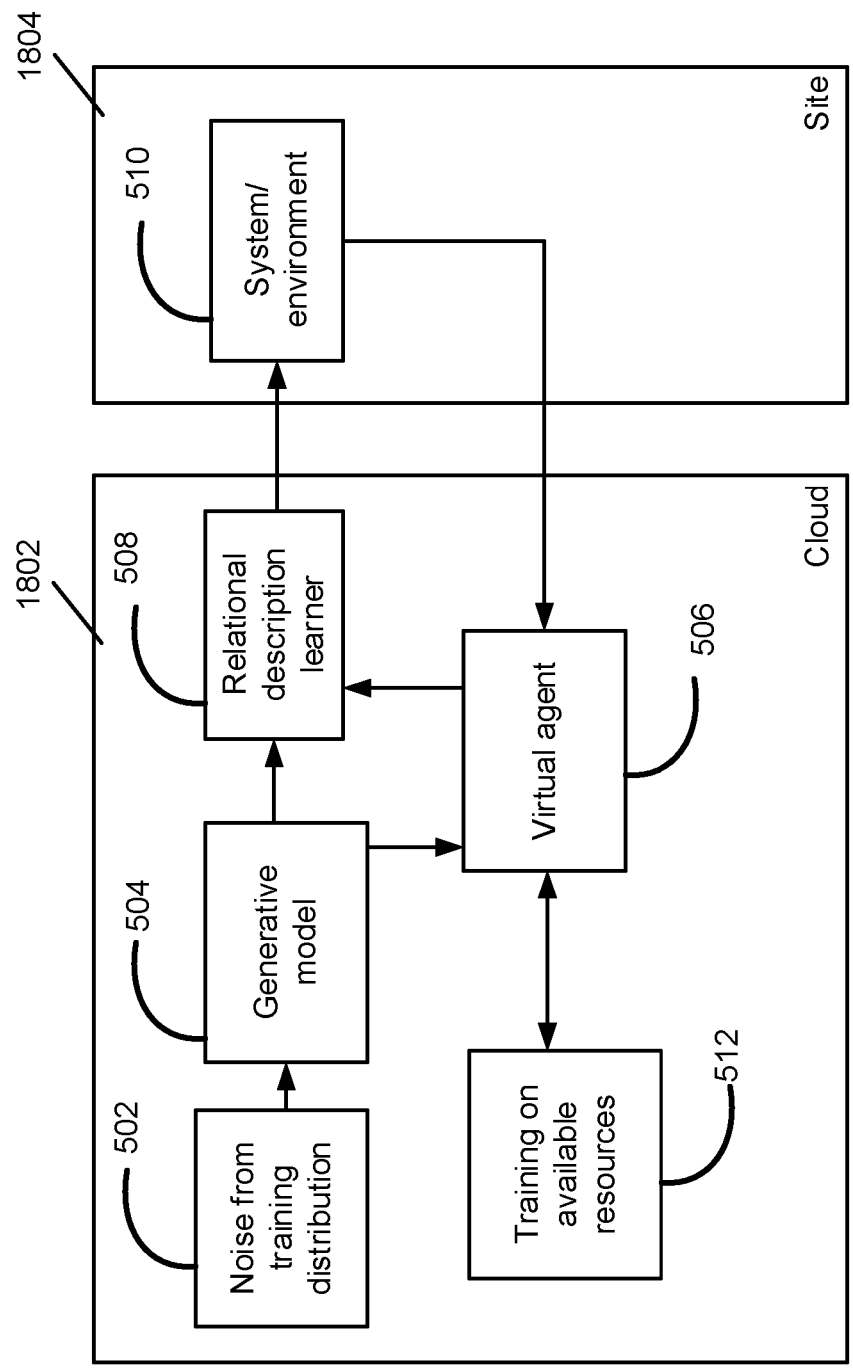
FIG. 18 is a block diagram illustrating a system that includes a cloud implementation according to some embodiments herein.

In some embodiments, the methods and systems described herein may be implemented in a cloud environment. For example, brief reference is made to FIG. 18, which is a block diagram illustrating a system that includes a cloud implementation according to some embodiments herein. Some embodiments provide that the components that can run in the cloud 1802 may include the GAN algorithm, the RL algorithm and/or the RDL, among others. Some embodiments provide that the noise from the training data distribution 502, the generator model 504, the RDL 508, and/or the virtual agent 506, among others. In such embodiments, the system/environment 510 may be at a site 1804. Some embodiments provide that the training set is enriched overtime with the addition of real world training samples as time goes on. In this manner, the newly generated problems from the generator model evolve over time and may not be limited to the original latent space, which may represent a limited training set. In this manner, the generator model may be able to continue to generate new problems over time.

In some embodiments, the interaction between these components may be done over one or more networks and/or on the same machine, whether virtually or physically implemented. Some embodiments provide that resources for the training the virtual agent 506 may include a simulation environment, and/or a configurable emulation environment, e.g., real 5G test bed. This may be used for the replication of the problem/scenario. The virtual agent 506 interacts with this environment during training, until finding out the most suitable solution.

Some embodiments of systems and methods provided herein may operate to automate the process of solving problems in sites, particularly, problems that have not yet occurred. For example, a generator model generates a unique realistic scenario/condition that might yield to a severe problem, such as site down even. In some embodiments, the generated scenario/condition may not have actually occurred, but may have some probability of appearing in the future. Next, a virtual agent may perform various actions, first in a randomized manner, and then providing better focused decisions over time until the virtual agent finds the best action that gives best reward. This may be done by first creating/replicating the scenario on a test site by the virtual agent automatically installing exactly the scope of the scenario/problem, and then by trying out different actions to address the problem. Examples of such actions include changing actual performance indicators and/or reconfiguring site setup, among others. Once the generated problem is addressed using the best action, which may be based on a reward obtained from the system/environment, then the GPM may be updated with the problem/solution pair and the site may become ready to address this unseen problem with a reasonable solution when/if the problem occurs in the future. Some embodiments provide that the action may be tested on a test bed site and/or on simulated environment.

Embodiments herein may reduce the problem solving time, reduce the cost of site failure, and/or shorten the work hours for engineers solving the specific problems. As such, a cost savings in managed services may be realized. This may improve site immunity to various faults.

Figure 19:
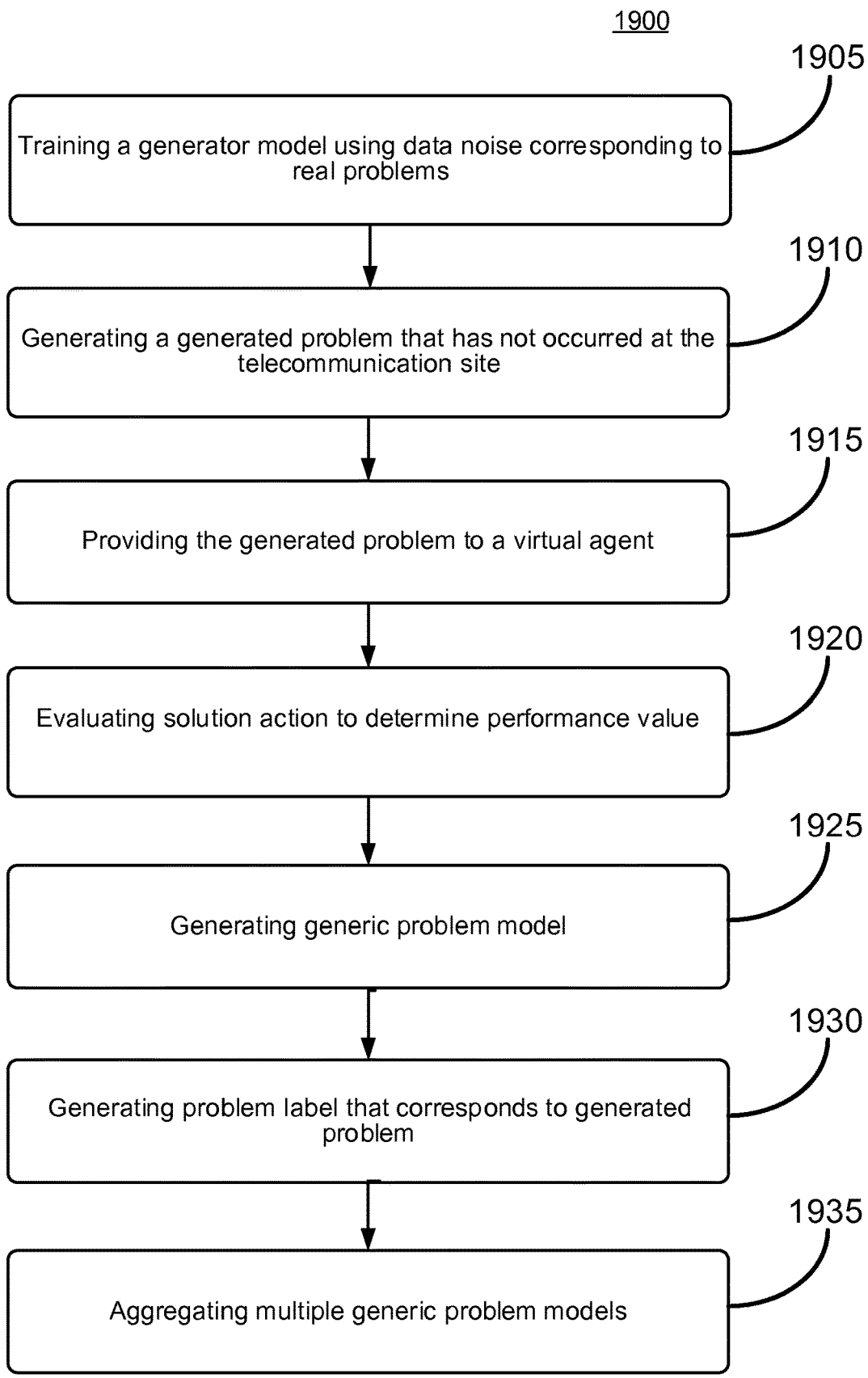
FIG. 19 is a flowchart illustrating operations of systems and methods herein according to some embodiments.

Reference is made to FIG. 19, which is a flowchart illustrating operations of systems and methods herein according to some embodiments. In some embodiments, a method 1900 may include training, using a generative adversarial network, a generator model using data noise that includes data corresponding to real problems of a telecommunication site (block 1905). The generator model may be trained to generate problems that are sufficiently realistic relative to real world problems that the generated problems may not be distinguishable from real problems.

Some embodiments provide that training the generator model may be accomplished using a generative adversarial network to iteratively generate multiple generated problems that are indistinguishable from real problems that have occurred. The generative adversarial network may include the generator model that is configured to generate multiple generated problems that correspond to the data noise and a discriminator model that is configured to determine a probability corresponding to each of the generated problems. The probability may correspond to a likelihood that the corresponding one of the generated problems is a real problem.

In some embodiments, training the generator model includes providing the probability corresponding to each of the generated problems to the generator model. In this manner, the generator model may receive feedback regarding the performance of the generated problems so that the generator model may experience improved performance during the training thereof.

Some embodiments provide that a percentage threshold may be determined that identifies whether or not the generator model is sufficiently trained. For example, if the generator model is generating problems that are consistently being evaluated to have a probability that the problems are real at a percentage greater than, for example, 50%, the generator model may be sufficiently trained according to some embodiments. Embodiments may include percentage thresholds that are more than and/or less than 50%.

In some embodiments, if the probability corresponding to one of the generated problems is less than a percentage threshold, then generator model may receive an error signal and may proceed to continue generating more generated problems. In some embodiments, the subsequently generated problems may be modified relative to a previously generated problem based on the error signal.

In some embodiments, the discriminator model is configured to decompose a set of input vectors in a real problem matrix into a probability value that regarding whether the input vector corresponds to a real problem or the generated problem. Some embodiments provide that the generator model is configured to compose a set of input vectors in a generated problem matrix from the data noise that includes data corresponding to real problems of a telecommunication site.

In some embodiments, the training status may be determined based on the loss performance of the generator model and the discriminator model. For example, if the loss performance of the generator model converges with the loss performance of the discriminator model, then the generator model may be determined to be trained. In some embodiments, if the generator model is trained then the generated problems may have a greater than 50 percent chance of being realistic problems that the telecommunication site could experience in the future.

Some embodiments include generating a generated problem that has not occurred at the telecommunication site (block 1910). In some embodiments, the generated problem may have a non-zero probability of occurring at the site in the future, which may be based on the effectiveness of the training of the generator model.

In some embodiments, the generated problem may be provided to a virtual agent (block 1915). The virtual agent may be configured to generate a solution action to resolve the generated problem. In response to the virtual agent determining a solution action that is successful at the telecommunication site, the virtual agent may receive a reward metric that may be provided by the telecommunication site and/or an environment that simulates the telecommunication site for evaluating the solution action. For example, the virtual agent may evaluate the solution action using a simulation of the telecommunication site, an emulation of the telecommunication site and/or the actual telecommunication site.

Some embodiments include evaluating the solution action relative to the generated problem to determine a performance value corresponding to the solution action (block 1920). Some embodiments provide that multiple different solution actions may be generated and evaluated. In some embodiments, evaluating the solution action includes iteratively evaluating multiple solution actions to determine an acceptable performance value. In some embodiments, a performance value may be determined for each of the solution actions. The relative performance of each of the solution actions may be determined by comparing the corresponding performance values to determine which of the solution actions may be a best solution to the generated problem.

In response to the performance value of a solution action for the generated problem being higher than performance values corresponding to other solution actions for the generated problem, a generic problem model that corresponds to the generated problem and that is associated with the solution action may be generated (block 1925). Some embodiments provide that generating the generic problem model includes generating multiple generic problem models. In some embodiments, an observed state of the telecommunication site may be matched to one of the generic problem models to detect an occurring real problem of a telecommunication site. In such embodiments, operations may include providing the solution action that corresponds to the relevant generic problem model.

Some embodiments provide that generating the generic problem model includes using a relational description learner to generate multiple generic problem models that correspond to different problems that the telecommunication site has not experienced.

Some embodiments include generating, by the virtual agent, a problem label that corresponds to the generated problem (block 1930). In some embodiments, the solution action is provided by the virtual agent and the virtual agent uses training resources to identify the solution action that includes a performance value that is higher than performance values corresponding to other solution actions.

Some embodiments provide that the plurality of generic problem models are aggregated by a relational description learner (1935). In some embodiments, aggregating the generic problem models may be accomplished by performing supervised machine learning using symbolic representations of problems. In some embodiments, the supervised machine learning may include receiving a first symptom set corresponding to the generated problem as a hypothesis corresponding to one of the real problems of the telecommunications site. The hypothesis may be compared to a second symptom set to determine a difference between the hypothesis and the second symptom set. Some embodiments provide that the hypothesis may be modified based on the difference between the hypothesis and the second symptom set and based on a label that corresponds to the first symptom set to generate a second hypothesis.

Figure 20:
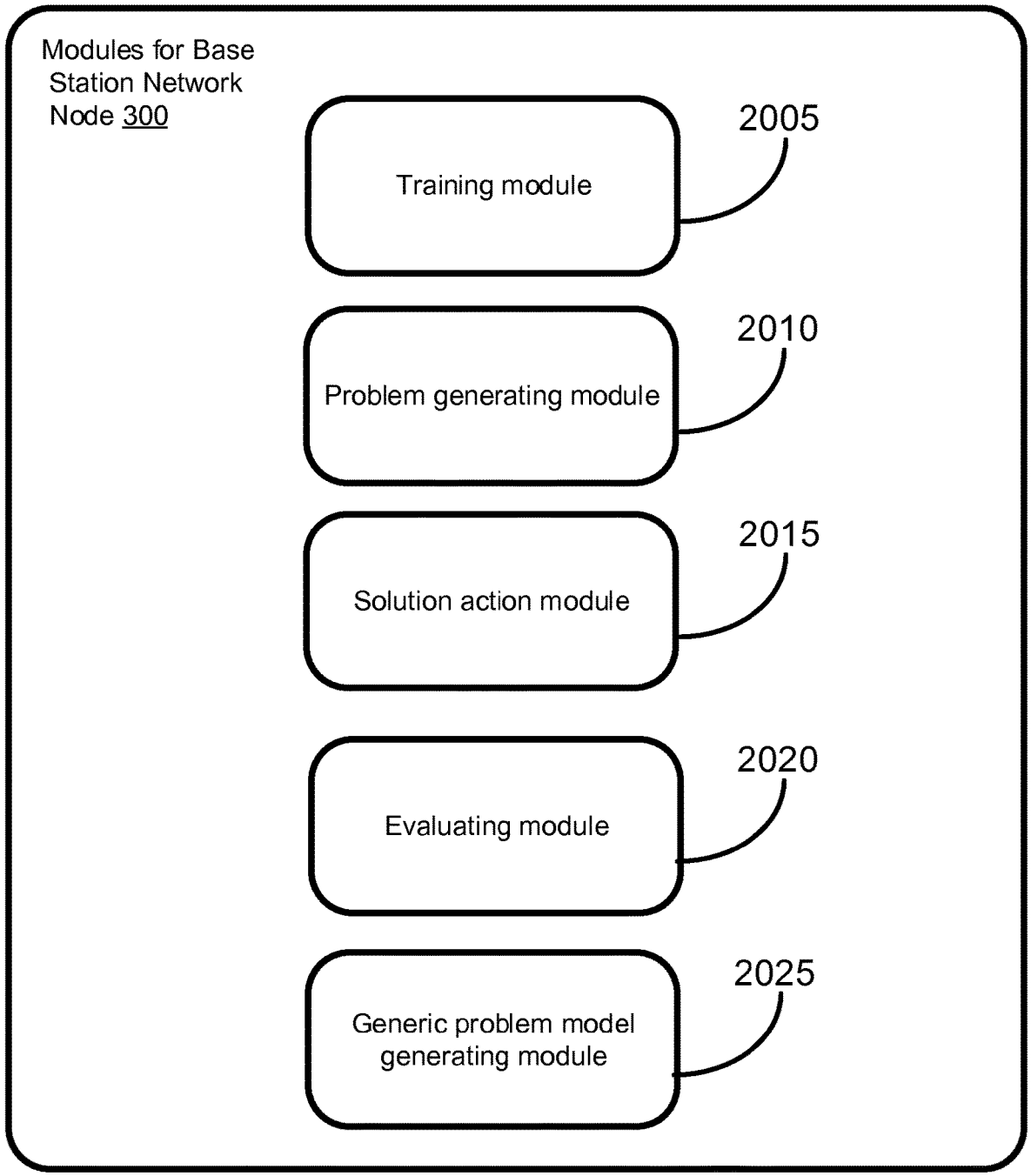
FIG. 20 illustrates modules for a base station network node 300 that performs operations as disclosed herein according to some embodiments.

Reference is now made to FIG. 20, which illustrates modules for a base station network node 300 that performs operations as disclosed herein according to some embodiments. Some embodiments include a training module 2005 that is configured to train, using a generative adversarial network, a generator model using data noise that includes data corresponding to real problems of a telecommunication site. A problem generating module 2010 may be configured to generate a generated problem that has not occurred at the telecommunication site and that has a non-zero probability of occurring at the site in the future. A solution action module 2015 may be configured to provide the generated problem to a virtual agent that is configured to generate a solution action to resolve the generated problem. An evaluating module 2020 may be configured to evaluate the solution action relative to the generated problem to determine a performance value corresponding to the solution action. A generic problem model generating module 2025 may, responsive to the performance value being higher than other performance values corresponding to other solution actions for the generated problem, be configured to generate a generic problem model that corresponds to the generated problem and that is associated with the solution action.

In some embodiments, a computer program comprises instructions which, when executed by at least one processor, causes at least one processor to carry out the functionality of a radio access node or another node implementing one or more of the functions of the radio access node in a virtual environment according to any of the embodiments described herein.

While the disclosed subject matter has been presented above with reference to various embodiments, it will be understood that various changes in form and details may be made to the described embodiments without departing from the overall scope of the disclosed subject matter.

LIST OF ABBREVIATIONS

MBMS Multimedia Broadcast Multicast Service
MCE Multi-cell/multicast Coordination Entity
Tx Transmitter
UE User Equipment
BS Base Station
BLER Block Error Ratio
DL Downlink
DPD Digital Predistortion
eNB Evolved Node B, base station
E-UTRAN Evolved universal terrestrial radio access network
E-UTRA Evolved universal terrestrial radio access
E-UTRA FDD E-UTRA frequency division duplex
E-UTRA TDD E-UTRA time division duplex
IM Inter modulation
KPI Key performance indicator
LBT Listen Before Talk
LLA Licensed-Assisted Access
LTE Long Term Evolution
ML Machine Learning
MCOT Maximal Channel Occupancy Time
GPM Generic Problem Model
RAT Radio Access Technology
RDL Relational Description Learner
RL Reinforcement Learning
SINR Signal-to-Interference plus Noise Ratio
SNR Signal-to-Noise Ratio
TPC Transmission Power Control
TDD Time division duplex
TxOP Transmission Opportunity
WLAN Wireless Local Area Network
UL Uplink In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Figure 21:
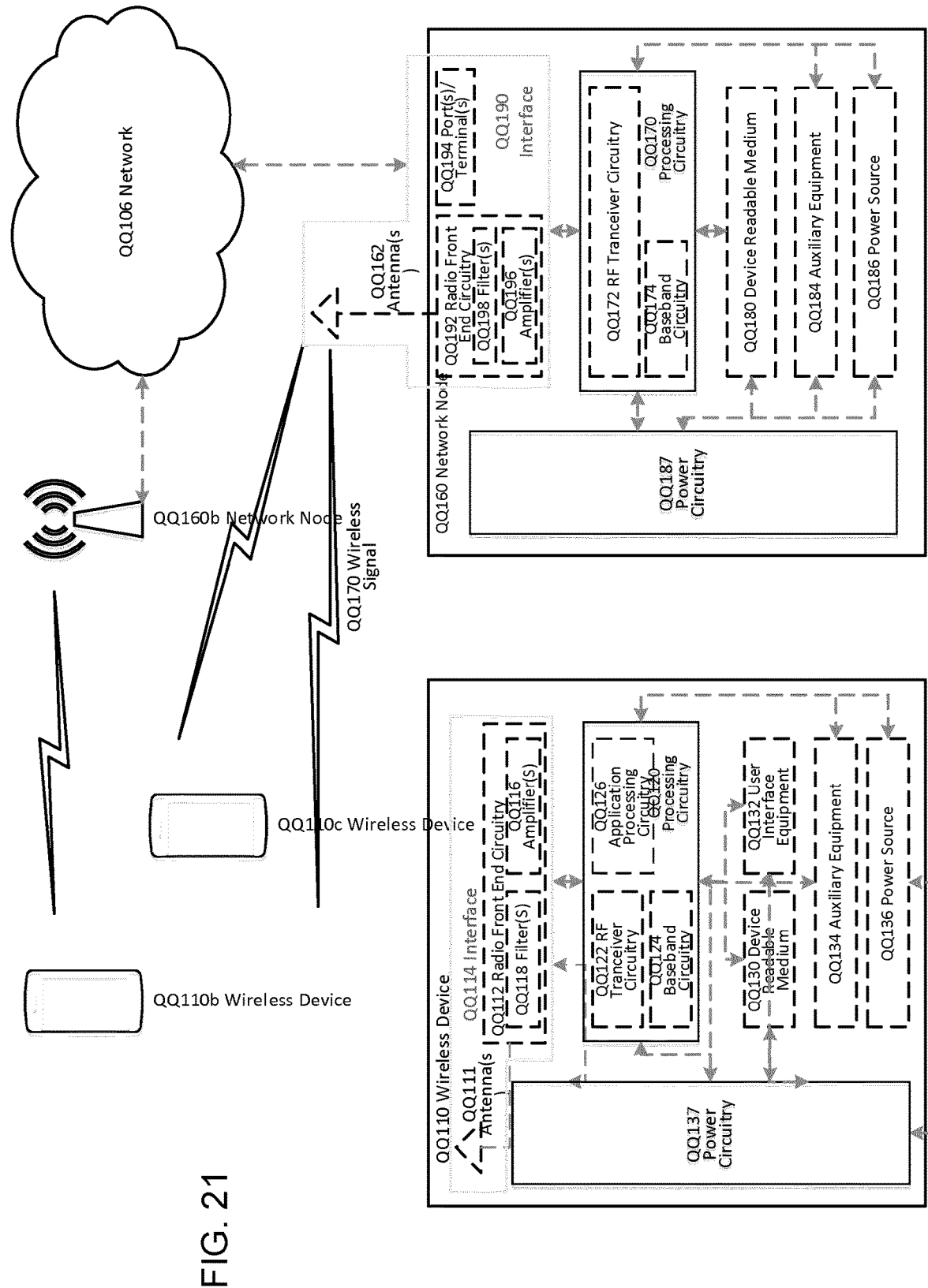
FIG. 21 is a block diagram of a wireless network in accordance with some embodiments.
Figure 22:
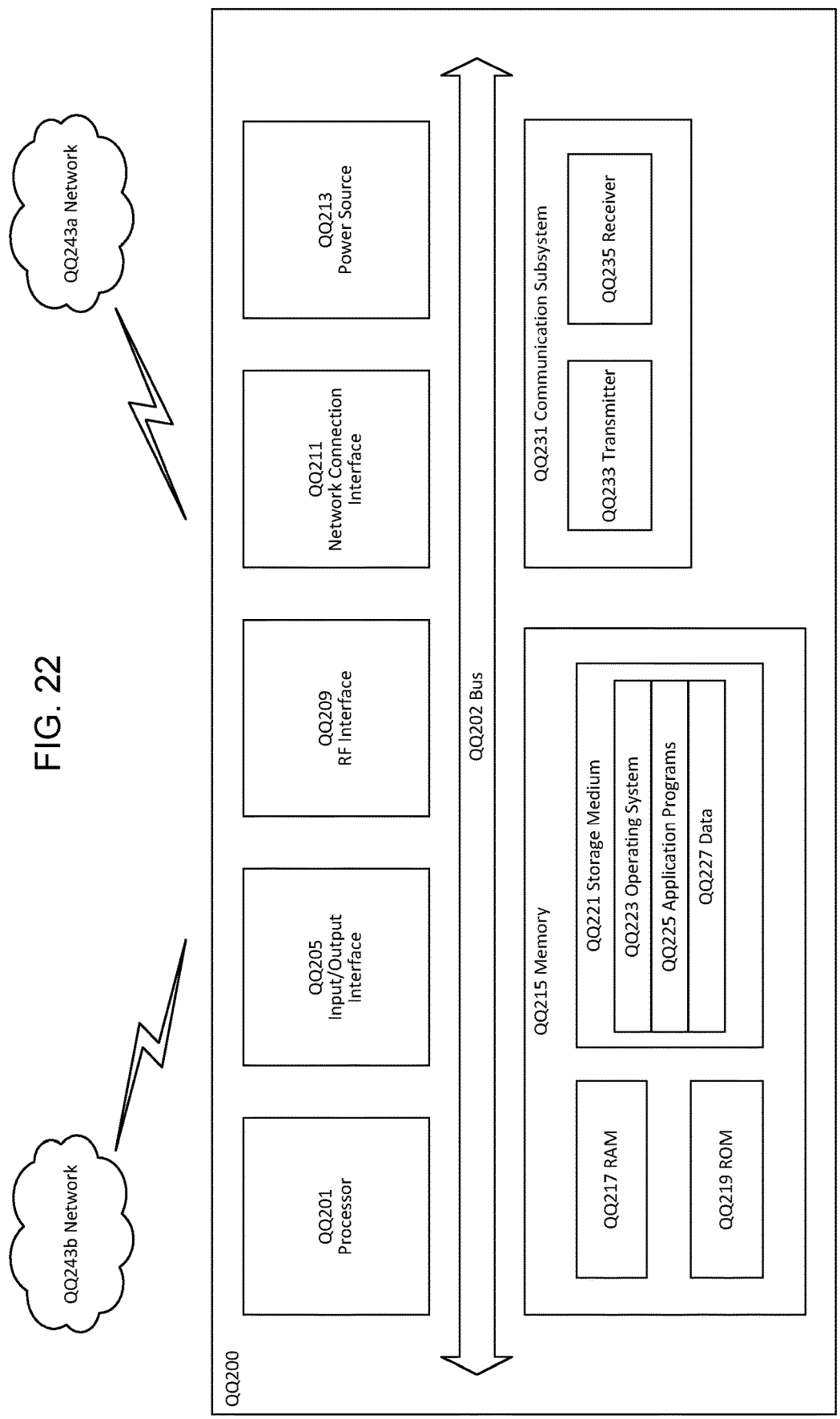
FIG. 22 is a block diagram of a user equipment in accordance with some embodiments.
Figure 23:
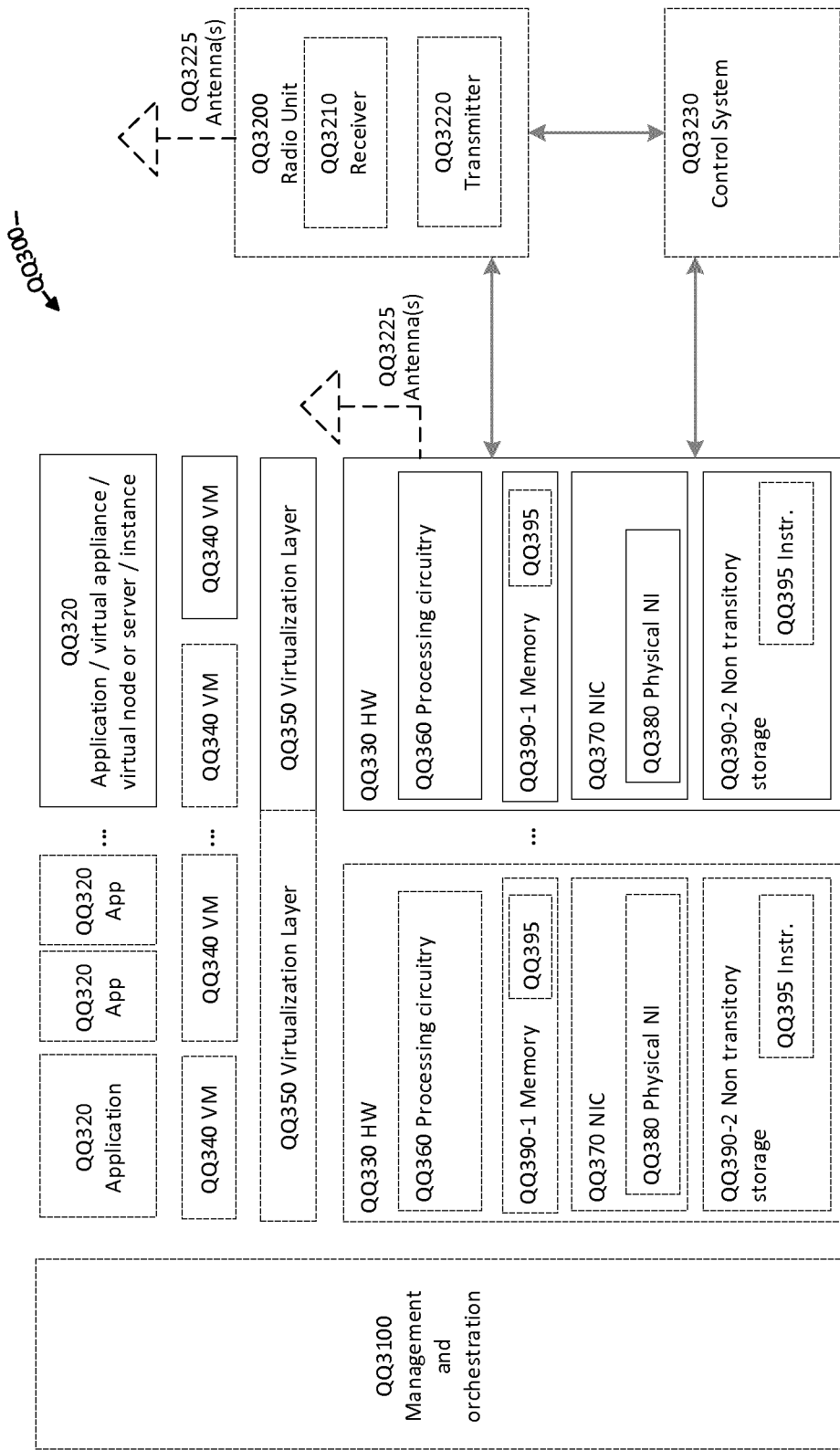
FIG. 23 is a block diagram of a virtualization environment in accordance with some embodiments.
Figure 24:
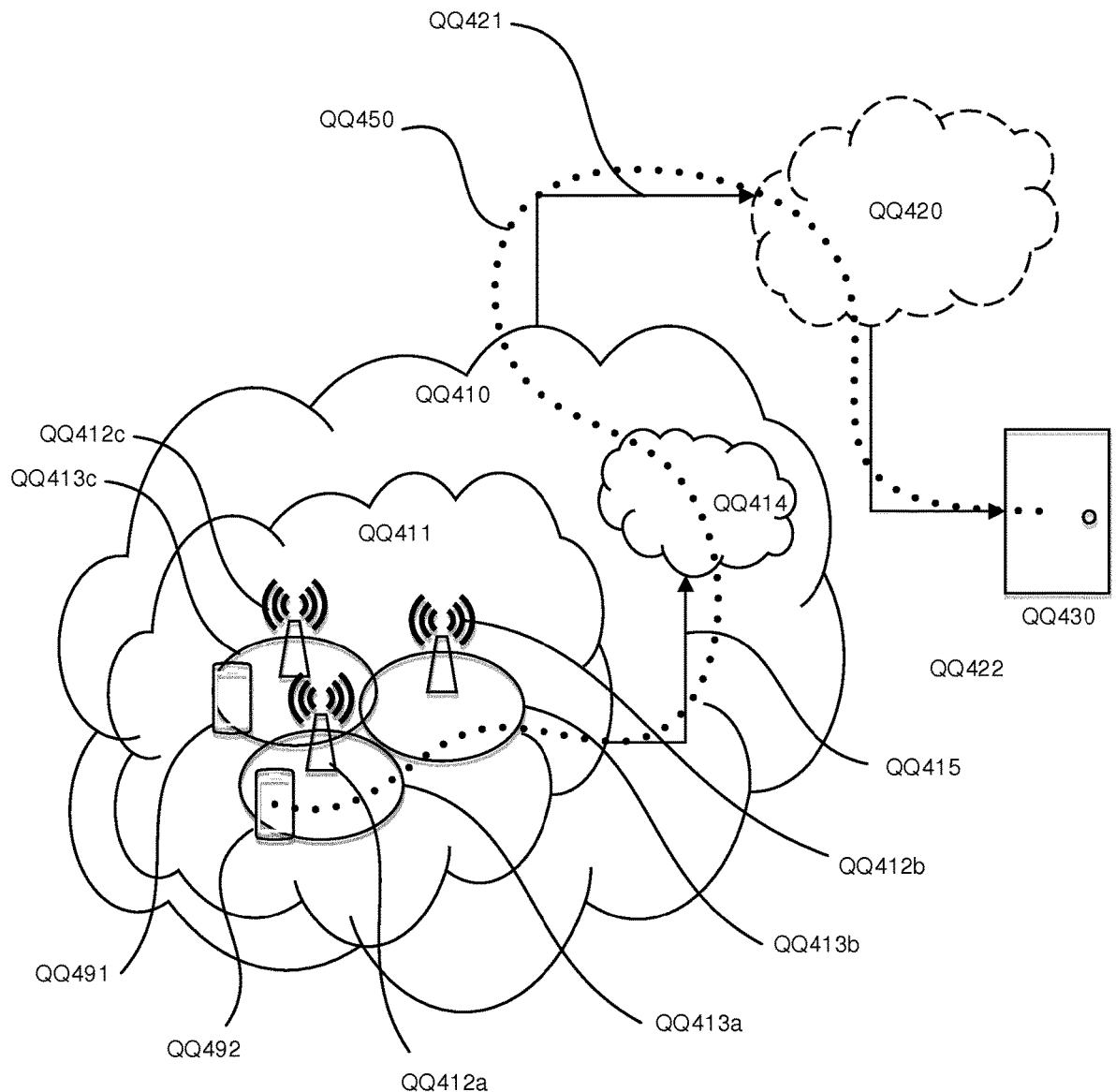
FIG. 24 is a block diagram of a telecommunication network connected via an intermediate network to a host computer in accordance with some embodiments.
Figure 25:
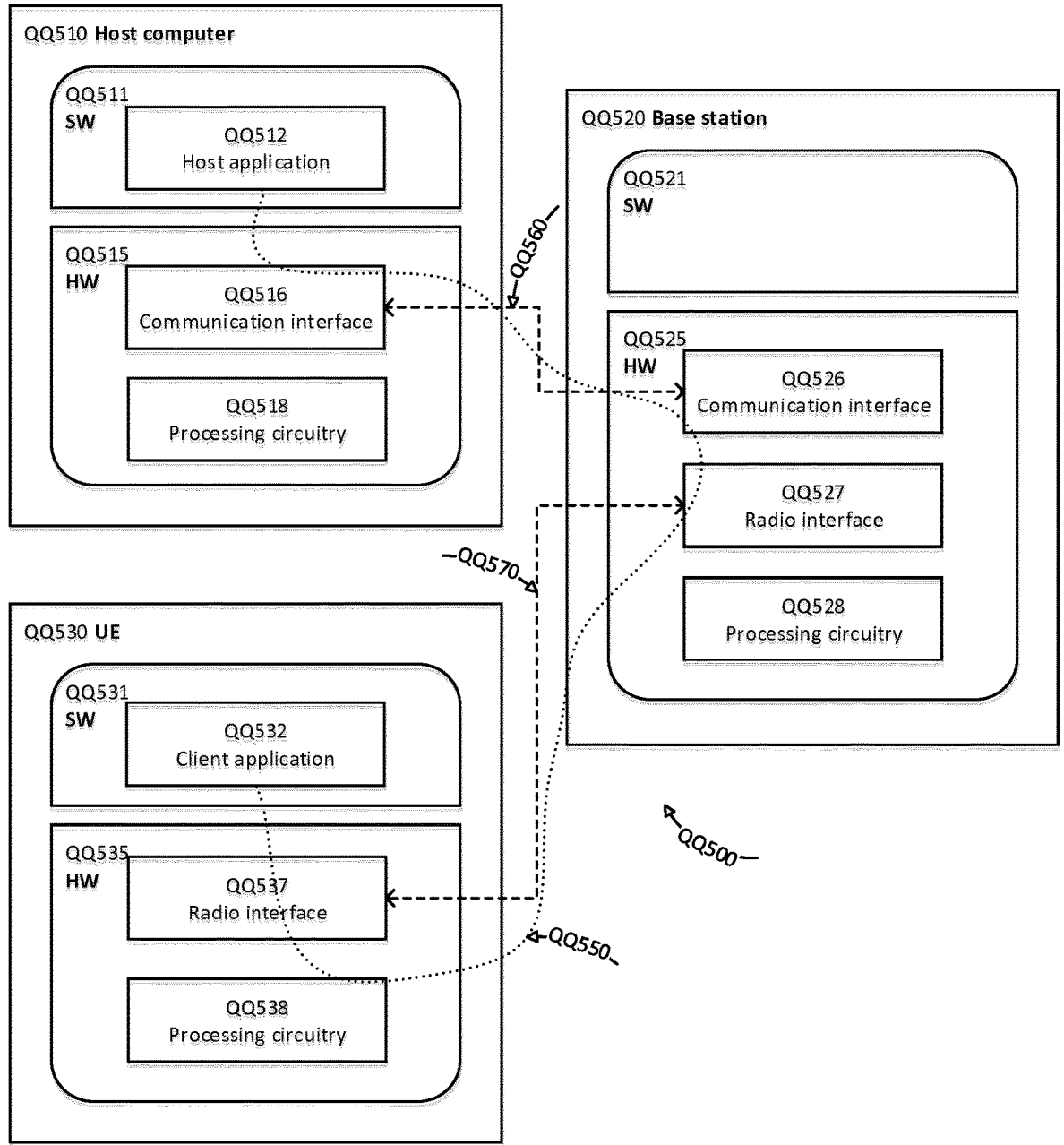
FIG. 25 is a block diagram of a host computer communicating via a base station with a user equipment over a partially wireless connection in accordance with some embodiments.
Figure 26:
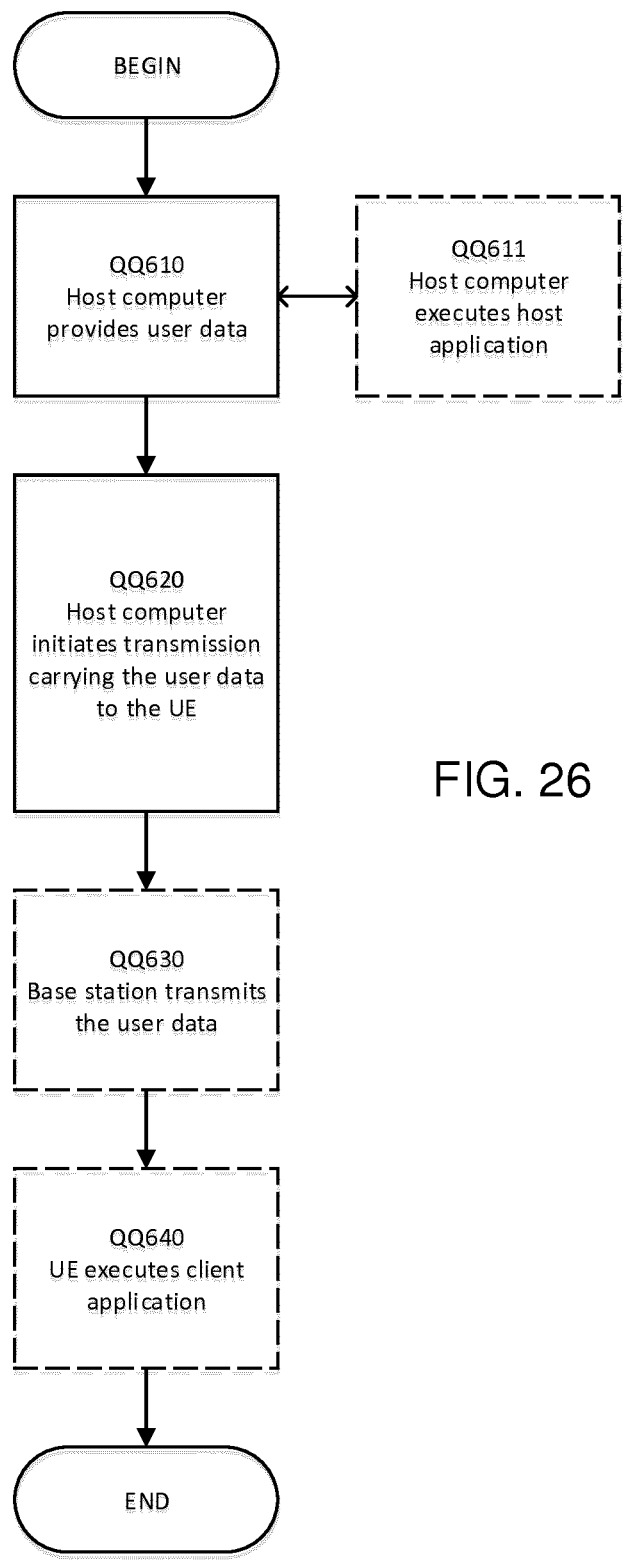
FIG. 26 is a block diagram of methods implemented in a communication system including a host computer, a base station and a user equipment in accordance with some embodiments.
Figure 27:
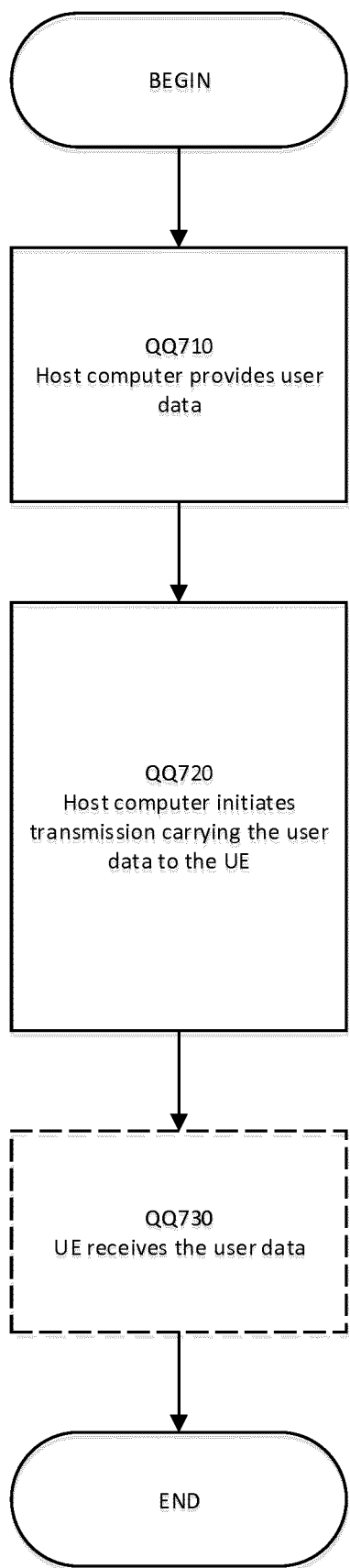
FIG. 27 is a block diagram of methods implemented in a communication system including a host computer, a base station and a user equipment in accordance with some embodiments.
Figure 28:
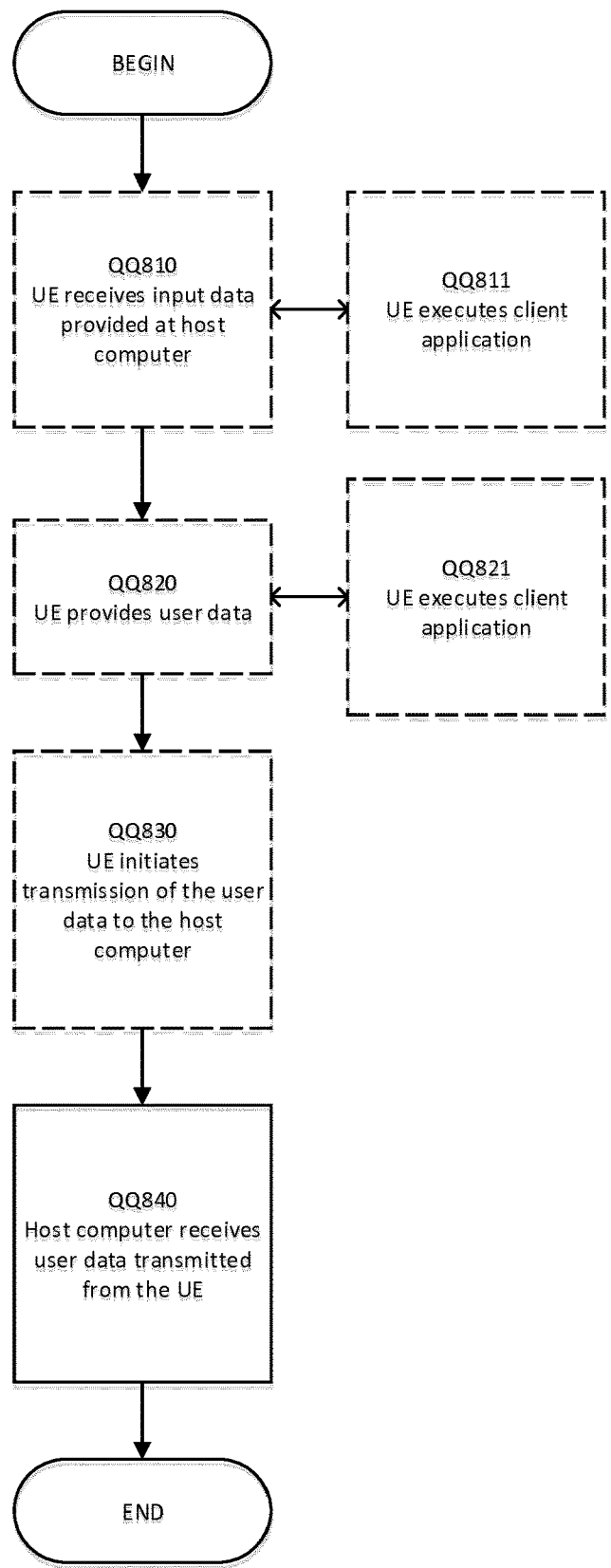
FIG. 28 is a block diagram of methods implemented in a communication system including a host computer, a base station and a user equipment in accordance with some embodiments.
Figure 29:
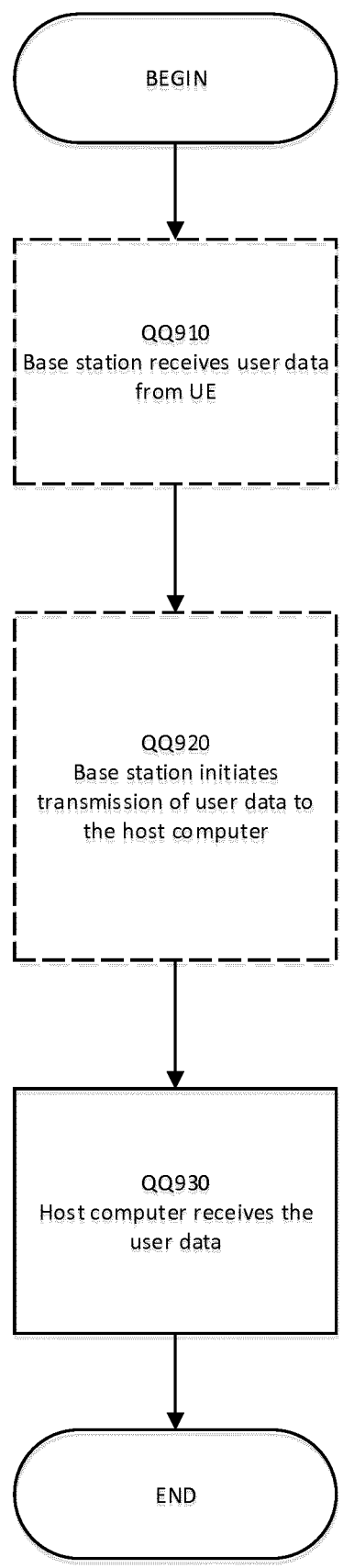
FIG. 29 is a block diagram of methods implemented in a communication system including a host computer, a base station and a user equipment in accordance with some embodiments.

Further definitions and embodiments are discussed below, in which FIG. 21 is a block diagram of a wireless network in accordance with some embodiments, FIG. 22 is a block diagram of a user equipment in accordance with some embodiments, FIG. 23 is a block diagram of a virtualization environment in accordance with some embodiments, FIG. 24 is a block diagram of a telecommunication network connected via an intermediate network to a host computer in accordance with some embodiments, FIG. 25 is a block diagram of a host computer communicating via a base station with a user equipment over a partially wireless connection in accordance with some embodiments, FIG. 26 is a block diagram of methods implemented in a communication system including a host computer, a base station and a user equipment in accordance with some embodiments, FIG. 27 is a block diagram of methods implemented in a communication system including a host computer, a base station and a user equipment in accordance with some embodiments, FIG. 28 is a block diagram of methods implemented in a communication system including a host computer, a base station and a user equipment in accordance with some embodiments, and FIG. 29 is a block diagram of methods implemented in a communication system including a host computer, a base station and a user equipment in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Referring to FIG. 21, although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 21 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Referring to FIG. 22, a user equipment in accordance with some embodiments is provided and illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 22, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 22, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Reference is now made to FIG. 23, which is a virtualization environment in accordance with some embodiments. FIG. 23 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 23, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 23.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Reference is now made to FIG. 24, which is a telecommunication network connected via an intermediate network to a host computer in accordance with some embodiments. With reference to FIG. 24, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 24 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Reference is now made to FIG. 25, which illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 25. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 25) served by base station QQ520. Communication interface QQ526 may be configured to facilitate connection QQ560 to host computer QQ510. Connection QQ560 may be direct or it may pass through a core network (not shown in FIG. 25) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 25 may be similar or identical to host computer QQ430, one of base stations QQ412a, QQ412b, QQ412c and one of UEs QQ491, QQ492 of FIG. 24, respectively. This is to say, the inner workings of these entities may be as shown in FIG. 25 and independently, the surrounding network topology may be that of FIG. 24.

In FIG. 25, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Reference is now made to FIG. 26, which illustrates methods implemented in a communication system including a host computer, a base station and a user equipment in accordance with some embodiments. FIG. 26 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 26 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Reference is now made to FIG. 27, which illustrates methods implemented in a communication system including a host computer, a base station and a user equipment in accordance with some embodiments. FIG. 27 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 27 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Reference is now made to FIG. 28, which illustrates methods implemented in a communication system including a host computer, a base station and a user equipment in accordance with some embodiments. FIG. 28 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 28 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Reference is now made to FIG. 29, which illustrates methods implemented in a communication system including a host computer, a base station and a user equipment in accordance with some embodiments. FIG. 29 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 29 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method for improving performance in a wireless communication network, the method comprising:
    training, using a generative adversarial network, a generator model that generates real problems of a telecommunication site from latent space problems using data noise;
    generating a generated problem that has not occurred at the telecommunication site and that has a non-zero probability of occurring at the telecommunication site in the future;
    providing the generated problem to a virtual agent that is configured to generate a solution action to resolve the generated problem;
    evaluating the solution action relative to the generated problem to determine a performance value corresponding to the solution action; and
    responsive to the performance value being higher than other performance values corresponding to other solution actions for the generated problem, generating a generic problem model that corresponds to the generated problem and that is associated with the solution action.

2. The method of claim 1, wherein training the generator model comprises using the generative adversarial network to iteratively generate a plurality of generated problems that are indistinguishable from a plurality of real problems that have occurred based on loss indications from a result of a discriminator model performance.

3. The method of claim 2, wherein the generative adversarial network comprises:
    the generator model that is configured to generate the plurality of generated problems that correspond to the data noise; and
    a discriminator model that is configured to determine a probability corresponding to each of the plurality of generated problems that corresponds to a likelihood that the corresponding one of the plurality of generated problems is a real problem.

4. The method of claim 3, wherein:
    training the generator model further comprises providing the probability corresponding to each of the plurality of generated problems to the generator model; and
    responsive to the probability corresponding to one of the plurality of generated problems being less than a percentage threshold, the generator model is further configured to receive an error signal and to generate a next one of the plurality of generated problems as a modified one of the plurality of generated problems.

5. The method of claim 3, wherein:
    the discriminator model is configured to decompose a set of input vectors in a real problem matrix into a probability value that corresponds to whether an input vector corresponds to a real problem or the generated problem; and
    the generator model is configured to compose a set of input vectors in a generated problem matrix from the data noise that includes data corresponding to real problems of a telecommunication site.

6. The method of claim 3, further comprising, responsive to a loss performance of the generator model converging with a loss performance of the discriminator model, determining that the generator model is trained such that, when the generator model is trained, the plurality of generated problems have a greater than 50 percent chance of being realistic problems that the telecommunication site could experience in the future.

7. The method of claim 1, further comprising generating, by the virtual agent, a problem label that corresponds to the generated problem, wherein:
    the solution action is provided by the virtual agent, and
    the virtual agent uses training resources to identify the solution action that includes the performance value that is higher than the other performance values.

8. The method of claim 1, wherein one or more of the following applies:
    evaluating the solution action comprises iteratively evaluating a plurality of solution actions to determine an acceptable performance value; and
    generating the generic problem model comprises using a relational description learner to generate a plurality of generic problem models that correspond to different problems that the telecommunication site has not experienced.

9. The method of claim 1, wherein:
    the generic problem model comprises a plurality of generic problem models; and
    the method further comprises aggregating, by a relational description learner, the plurality of generic problem models based on performing supervised machine learning using symbolic representations of problems.

10. The method of claim 9, wherein performing supervised machine learning comprises:
receiving a first symptom set corresponding to the generated problem as a hypothesis corresponding to one of the real problems of the telecommunications site;
comparing the hypothesis to a second symptom set to determine a difference between the hypothesis and the second symptom set; and
modifying the hypothesis based on the difference between the hypothesis and the second symptom set and based on a label that corresponds to the first symptom set to generate a second hypothesis.

11. The method of claim 1, wherein generating the generic problem model comprises generating plurality of generic problem models, the method further comprising:
matching an observed state of the telecommunication site to one of the plurality of generic problem models to detect an occurring real problem of a telecommunication site; and
providing the solution action that corresponds to the one of the plurality of generic problem models.

12. The method of claim 1, further comprising:
receiving an identification of a real problem at the telecommunication site;
comparing data corresponding to the real problem with data corresponding to the generic problem model; and
responsive to the generic problem model corresponding to the real problem, providing the solution action that is associated with the generic problem model to the telecommunication site.

13. A non-transitory computer readable medium storing program code that when executed by a processor of a wireless apparatus, configures the wireless communication apparatus to perform operations corresponding to the method of claim 1, wherein the wireless communication apparatus is a wireless communication device or a network node in a wireless communication network.

14. A network node in a wireless communication network, comprising:
a transceiver configured for wireless communication via a radio interface;
at least one processor coupled to the transceiver; and
at least one memory coupled to the at least one processor and storing program code that when executed by the at least one processor causes the network node to:
train, using a generative adversarial network, a generator model using data noise that includes data corresponding to real problems of a telecommunication site;
generate a generated problem that has not occurred at the telecommunication site and that has a non-zero probability of occurring at the telecommunication site in the future;
provide the generated problem to a virtual agent that is configured to generate a solution action to resolve the generated problem;
evaluate the solution action relative to the generated problem to determine a performance value corresponding to the solution action; and
responsive to the performance value being higher than other performance values corresponding to other solution actions for the generated problem, generate a generic problem model that corresponds to the generated problem and that is associated with the solution action.

15. The network node of claim 14, wherein:
execution of the program code causes the network node to train the generator model by using the generative adversarial network to iteratively generate a plurality of generated problems that are indistinguishable from a plurality of real problems that have occurred;
the generative adversarial network comprises:
the generator model that is configured to generate the plurality of generated problems that correspond to the data noise, and
a discriminator model that is configured to determine a probability corresponding to each of the plurality of generated problems that corresponds to a likelihood that the corresponding one of the plurality of problems is a real problem.

16. The network node of claim 15, wherein:
execution of the program code further causes the network node to train the generator model by providing the probability corresponding to each of the plurality of generated problems to the generator model, and
responsive to the probability corresponding to one of the plurality of generated problems being less than a percentage threshold, the generator model is further configured to receive an error signal and to generate a next one of the plurality of generated problems as a modified one of the plurality of generated problems.

17. The network node of claim 15, wherein:
the discriminator model is configured to decompose a set of input vectors in a real problem matrix into a probability value that corresponds to whether an input vector corresponds to a real problem or the generated problem; and
the generator model is configured to compose a set of input vectors in a generated problem matrix from the data noise that includes data corresponding to real problems of a telecommunication site.

18. The network node of claim 14, wherein execution of the program code further causes the network node to, responsive to a loss performance of the generator model converging with a loss performance of the discriminator model, determine that the generator model is trained such that, when the generator model is trained, the plurality of generated problems have a greater than 50 percent chance of being realistic problems that the telecommunication site could experience in the future.

19. The network node of claim 14, wherein execution of the program code further causes the network node to generate, by the virtual agent, a problem label that corresponds to the generated problem, wherein:
the solution action is provided by the virtual agent; and
the virtual agent uses training resources to identify the solution action that includes the performance value that is higher than the other performance values.

20. The network node of claim 14, wherein one or more of the following applies:
execution of the program code causes the network node to evaluate the solution action based on iteratively evaluating a plurality of solution actions to determine an acceptable performance value; and
execution of the program code causes the network node to generate the generic problem model based on using a relational description learner to generate a plurality of generic problem models that correspond to different problems that the telecommunication site has not experienced.

21. The network node of claim 14, wherein:
the generic problem model comprises a plurality of generic problem models; and
execution of the program code further causes the network node to aggregate, by a relational description learner, the plurality of generic problem models based on performing supervised machine learning using symbolic representations of problems.

22. A user equipment (UE) comprising:
a transceiver configured for wireless communication via a radio interface;
at least one processor coupled to the transceiver; and
at least one memory coupled to the at least one processor and storing program code that when executed by the at least one processor causes the UE to perform the method of claim 1.

\* \* \* \* \*